(12) United States Patent
Rothman et al.

(10) Patent No.: US 12,048,946 B2
(45) Date of Patent: Jul. 30, 2024

(54) PROCESSES FOR COATING RETICULATED FOAMS

(71) Applicant: CiDRA Corporate Services LLC, Wallingford, CT (US)

(72) Inventors: Paul J. Rothman, Windsor, CT (US); Mark R. Fernald, Enfield, CT (US); Paul Dolan, Portland, CT (US); Michael Stephen Ryan, Newtown, CT (US); Timothy J. Bailey, Longmeadow, MA (US); Kirk Johnson, Killingworth, CT (US); Patrick Tuxbury, Wallingford, CT (US); Kevin Rodney Lassila, Bethany, CT (US); Michael D. Coppola, Trumball, CT (US); Allison K. Greene, West Hartford, CT (US)

(73) Assignees: CIDRA CORPORATE SERVICES LLC, Wallingford, CT (US); BYK-CHEMIE GMBH, Wesel (DE)

( * ) Notice: Subject to any disclaimer, the term of this patent is extended or adjusted under 35 U.S.C. 154(b) by 985 days.

(21) Appl. No.: 16/552,515

(22) PCT Filed: Feb. 28, 2018

(86) PCT No.: PCT/US2018/020132
§ 371 (c)(1),
(2) Date: Aug. 27, 2020

(87) PCT Pub. No.: WO2018/160642
PCT Pub. Date: Sep. 7, 2018

(65) Prior Publication Data
US 2020/0406291 A1    Dec. 31, 2020

Related U.S. Application Data

(60) Provisional application No. 62/464,560, filed on Feb. 28, 2017.

(51) Int. Cl.
B05D 1/28 (2006.01)
B05D 1/40 (2006.01)
(Continued)

(52) U.S. Cl.
CPC ............... B05D 1/28 (2013.01); C08J 9/365 (2013.01); B05D 1/40 (2013.01); B05D 3/12 (2013.01);
(Continued)

(58) Field of Classification Search
CPC ... B05D 1/28; B05D 1/40; B05D 3/12; B05D 2201/02; B05D 2252/10; B05D 1/18;
(Continued)

(56) References Cited

U.S. PATENT DOCUMENTS 3,416,489 A * 12/1968 Hoffman .................. F16N 7/30
118/227
3,667,984 A    6/1972 Adams
(Continued)

FOREIGN PATENT DOCUMENTS

EP    3023455 A1    5/2016
GB    2276336 A    9/1994
(Continued)

OTHER PUBLICATIONS

Definition of copolymer. Mark Alger, ed., Polymer Science Dictionary 101 (2d ed. 1989). (Year: 1989).*

Primary Examiner — William P Fletcher, III
(74) Attorney, Agent, or Firm — Ware, Fressola, Maguire & Barber LLP

(57) ABSTRACT

A process of coating an open-cell foam substrate includes the steps of arranging two rollers separated by a gap; positioning the substrate above the gap; providing a coating material onto the substrate, feeding the substrate through the gap so as to achieve a layer of the coating material on the (Continued)

substrate, wherein the coating material is selected from the group consisting of a polysiloxane derivative, acrylic polymer, butyl rubber, natural rubber, nitriles, styrene block copolymers with ethylene, styrene block copolymers with propylene, styrene block copolymers with isoprene and polyvinyl ether and modifying the coating with tackifiers; plasticizers; crosslinking agents; chain transfer agents; chain extenders; adhesion promoters; aryl or alky copolymers; fluorinated copolymers; hexamethyldisilazane; and silica.

14 Claims, 12 Drawing Sheets

(51) Int. Cl.
*B05D 3/12* (2006.01)
*C08J 9/36* (2006.01)
(52) U.S. Cl.
CPC ...... *B05D 2201/02* (2013.01); *B05D 2252/10* (2013.01); *C08J 2205/05* (2013.01)
(58) Field of Classification Search
CPC ... B05D 2201/00; C08J 9/365; C08J 2205/05; C08J 2201/026; B01J 20/28045; B01J 20/321; B01J 20/3212; B01J 20/3234; B01J 20/327; B01J 20/3272; B01J 20/328
See application file for complete search history.

(56) References Cited

U.S. PATENT DOCUMENTS

| | | | | |
|---|---|---|---|---|
| 3,679,058 | A | * | 7/1972 | Smith .................. E02B 15/104 210/924 |
| 3,741,844 | A | * | 6/1973 | Schwartz ............... B32B 27/00 156/244.11 |
| 3,894,165 | A | | 7/1975 | Bates |
| 4,159,356 | A | * | 6/1979 | Jablonski ............... D06B 1/143 427/244 |
| 4,276,107 | A | | 6/1981 | Pufahl |
| 5,338,340 | A | | 8/1994 | Kasmark, Jr. et al. |
| 6,284,360 | B1 | * | 9/2001 | Johnson .................. B32B 27/40 428/317.1 |
| 8,469,915 | B2 | | 6/2013 | Johannison et al. |
| 9,327,294 | B2 | | 5/2016 | Rothman et al. |
| 9,352,335 | B2 | | 5/2016 | Rothman et al. |
| 2004/0255785 | A1 | | 12/2004 | Koslow |
| 2005/0172898 | A1 | * | 8/2005 | Hein ..................... C23C 14/562 118/718 |
| 2006/0182944 | A1 | | 8/2006 | Leavitt et al. |
| 2008/0227634 | A1 | | 9/2008 | Muller et al. |
| 2012/0216832 | A1 | | 8/2012 | Pung et al. |
| 2012/0276339 | A1 | | 11/2012 | Pearce et al. |
| 2014/0141233 | A1 | | 5/2014 | Crawford et al. |

FOREIGN PATENT DOCUMENTS

| | | | | |
|---|---|---|---|---|
| NL | 7207251 | A | | 12/1972 |
| NL | 7803527 | A | | 10/1978 |
| WO | 9325380 | A1 | | 12/1993 |
| WO | WO1993/25380 | | * | 12/1993 |
| WO | WO-199325380 | A1 | * | 12/1993 ............. B29C 43/28 |
| WO | 2006127533 | A1 | | 11/2006 |
| WO | 2014/149730 | | | 9/2014 |
| WO | WO-2014149730 | A1 | * | 9/2014 ........... B29C 44/569 |
| WO | 2016107631 | A1 | | 7/2016 |
| WO | WO-2016107631 | A1 | * | 7/2016 ........... B05C 1/0813 |
| WO | 2018036790 | A1 | | 3/2018 |
| WO | 2018091264 | A1 | | 5/2018 |

* cited by examiner

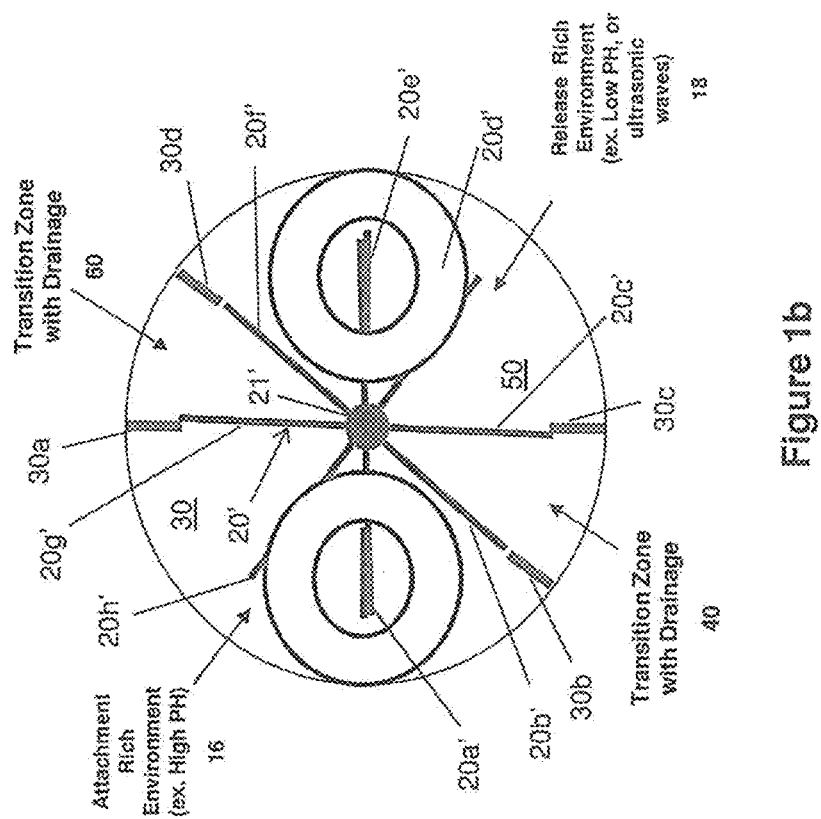
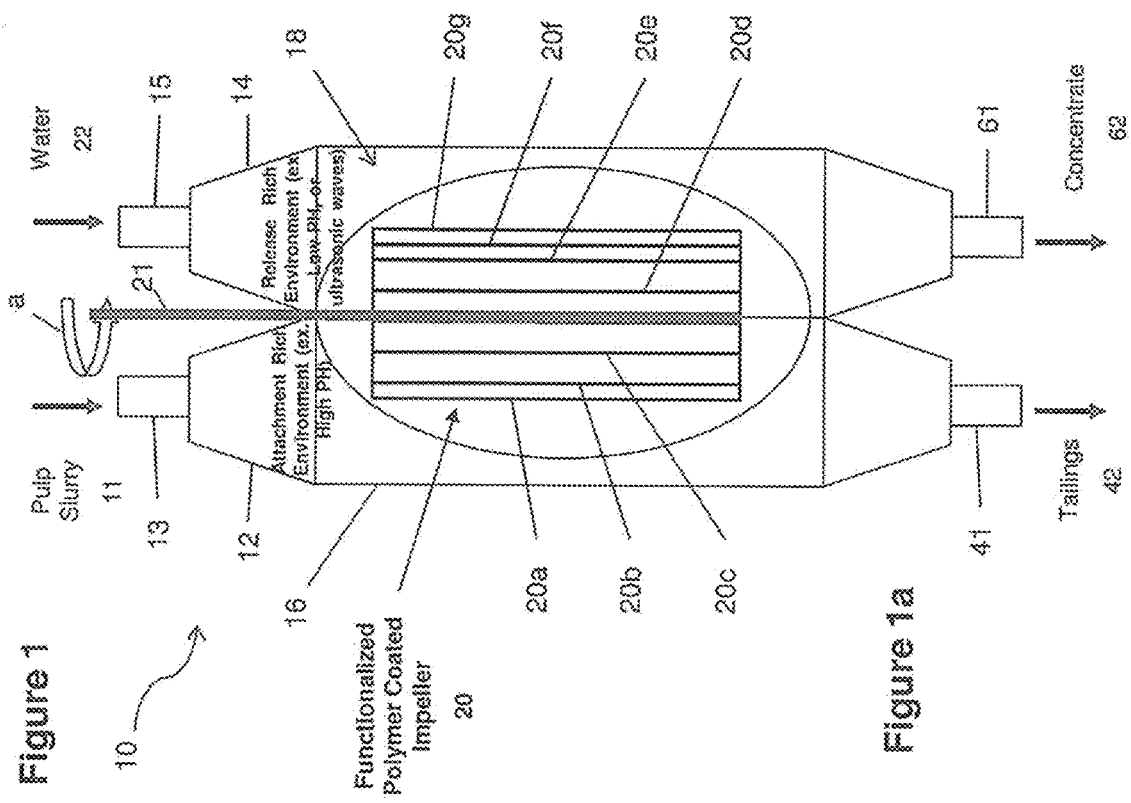

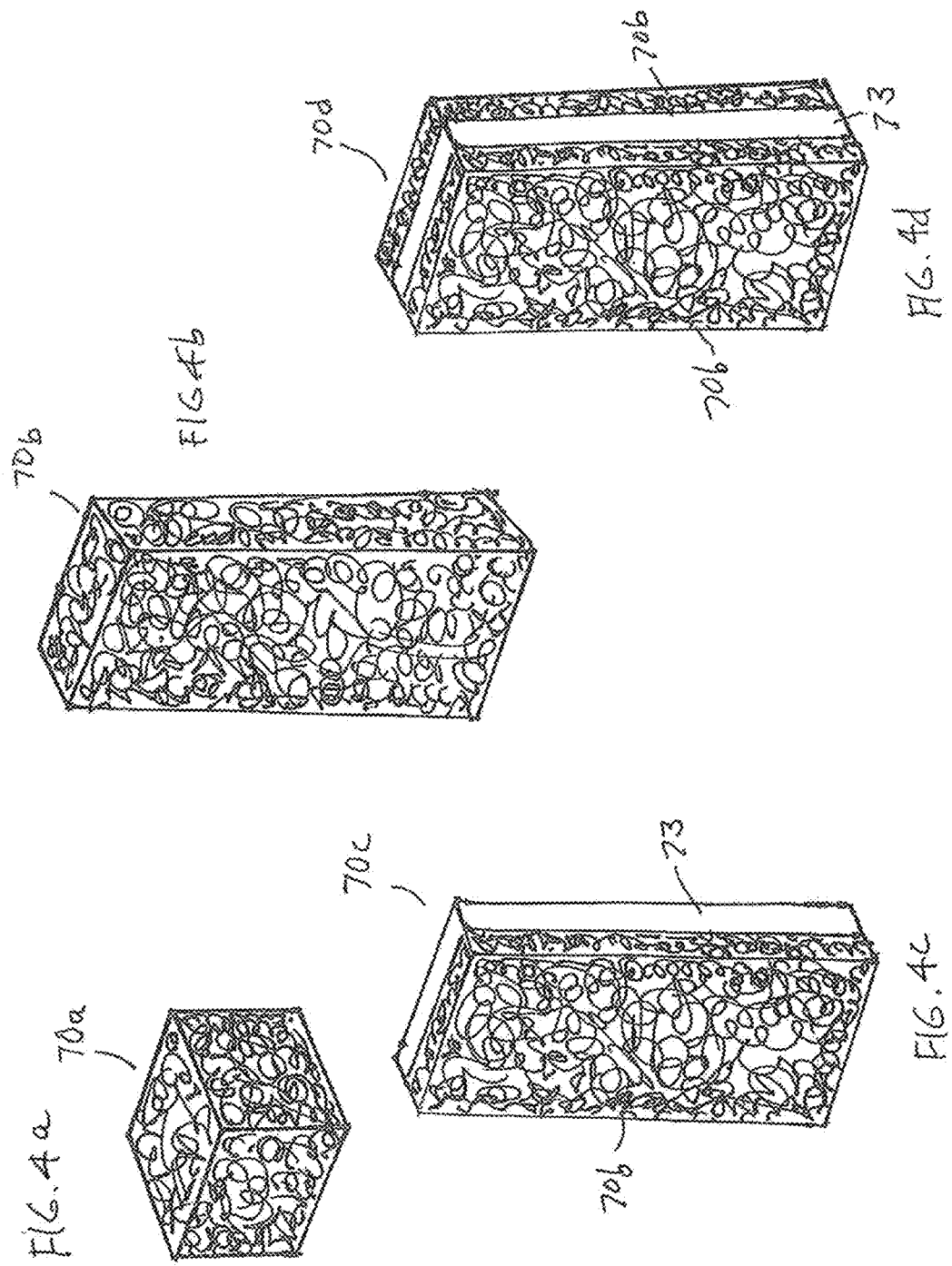

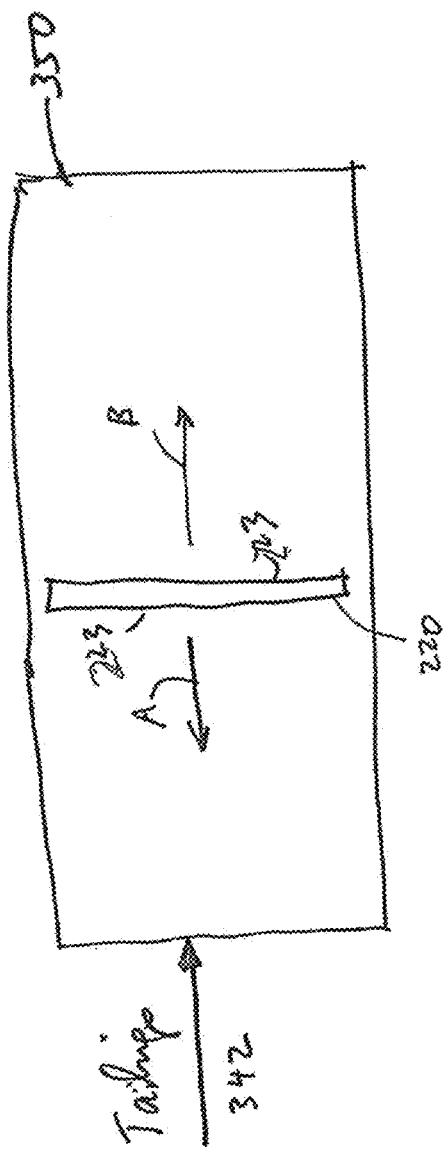

PROCESSES FOR COATING RETICULATED FOAMS

CROSS-REFERENCE TO RELATED PATENT APPLICATIONS

The present application claims the benefit of U.S. Provisional Patent Application No. 62/464,560, filed 28 Feb. 2017, entitled "Processes for coating reticulated foams", which is incorporated by reference herein in its entirety.

The present application is related to PCT application No. PCT/US17/59560, filed 2, Nov. 2017, entitled "Polymer coating for selective separation of hydrophobic particles in aqueous slurry", which claims the benefit of U.S. Provisional Patent Application No. 62/416,314, filed 2 Nov. 2016, entitled "Polymer coating for selective separation of hydrophobic particles in aqueous slurry", which are incorporated by reference herein in their entirety.

The present application is related to U.S. Pat. No. 10,835,905 B2, filed 9 Jan. 2017, entitled "Recovery media for mineral processing, using open cell or reticulated foam having 3-dimensional functionalized open-network structure for selective separation of mineral particles in an aqueous system", which is a continuation-in-part application of PCT application PCT/US12/39534, filed 25 May 2012, entitled "Mineral separation using functionalized membrane", which claims the benefit of U.S. provisional application No. 61/489,893, filed 25 May 2011 and U.S. provisional application No. 61/533,544, filed 12 Sep. 2011, which are all incorporated by reference herein in their entirety.

This application is also related to a family of eight PCT applications, which were all concurrently filed on 25 May 2012, as follows:

PCT application no. PCT/US12/39528, entitled "Flotation separation using lightweight synthetic bubbles and beads;"

PCT application no. PCT/US12/39540, entitled "Mineral separation using sized, weighted and magnetized beads;"

PCT application no. PCT/US12/39576, entitled "Synthetic bubbles/beads functionalized with molecules for attracting or attaching to mineral particles of interest," which corresponds to U.S. Pat. No. 9,352,335;

PCT application no. PCT/US12/39591, entitled "Method and system for releasing mineral from synthetic bubbles and beads;"

PCT application no. PCT/US/39596, entitled "Synthetic bubbles and beads having hydrophobic surface;"

PCT application no. PCT/US/39631, entitled "Mineral separation using functionalized filters and membranes," which corresponds to U.S. Pat. No. 9,302,270;"

PCT application no. PCT/US12/39655, entitled "Mineral recovery in tailings using functionalized polymers;" and PCT application no. PCT/US12/39658, entitled "Techniques for transporting synthetic beads or bubbles In a flotation cell or column," all of which are incorporated by reference in their entirety.

This application also related to PCT application no. PCT/US2013/042202, filed 22 May 2013, entitled "Charged engineered polymer beads/bubbles functionalized with molecules for attracting and attaching to mineral particles of interest for flotation separation," which claims the benefit of U.S. Provisional Patent Application No. 61/650,210, filed 22 May 2012, which is incorporated by reference herein in its entirety.

This application is also related to PCT/US2014/37823, filed 13 May 2014, entitled "Polymer surfaces having a siloxane functional group," which claims benefit to U.S. Provisional Patent Application No. 61/822,679, filed 13 May 2013, which is incorporated by reference herein in its entirety.

This application also related to PCT application no. PCT/US13/28303, filed 28 Feb. 2013, entitled "Method and system for flotation separation in a magnetically controllable and steerable foam," which is also hereby incorporated by reference in its entirety.

This application also related to PCT application no. PCT/US16/57334, filed 17 Oct. 2016, entitled "Opportunities for recovery augmentation process as applied to molybdenum production," which is also hereby incorporated by reference in its entirety.

This application also related to PCT application no. PCT/US16/37322, filed 17 Oct. 2016, entitled "Mineral beneficiation utilizing engineered materials for mineral separation and coarse particle recovery," which is also hereby incorporated by reference in its entirety.

BACKGROUND OF THE INVENTION

1. Technical Field

This invention relates generally to a method and apparatus for separating valuable material from unwanted material in an aqueous mixture, such as a pulp slurry.

2. Description of Related Art

In many industrial processes, flotation is used to separate valuable or desired material from unwanted material. By way of example, in this process a mixture of water, valuable material, unwanted material, chemicals and air is placed into a flotation cell. The chemicals are used to make the desired material hydrophobic, as well as to aid the formation of bubbles and the stability of the froth, and the air is used to carry the material to the surface of the flotation cell. When the hydrophobic material and the air bubbles collide they become attached to each other. The bubble rises to the surface carrying the desired material with it.

The performance of the flotation cell is dependent on the bubble surface area flux in the collection zone of the cell. The bubble surface area flux is dependent on the size of the bubbles and the air injection rate. Controlling the bubble surface area flux has traditionally been very difficult. This is a multivariable control problem and there are no dependable real time feedback mechanisms to use for control.

There is a need in the industry to provide a better way to separate valuable material from unwanted material, e.g., including in such a flotation cell, so as to eliminate problems associated with using air bubbles in such a separation process.

SUMMARY OF THE INVENTION

The present invention provides a substrate for use in an aqueous slurry. The substrate has a polymeric coating to provide a compliant and tacky surface of low energy in order to enhance selective collection of hydrophobic and hydrophobized mineral particles ranging widely in particle size when distributed in an aqueous slurry. The substrate may have an open-cell foam structure. The polymer coating may be applied to the open-cell foam structure, for example. The coating is arranged to be homogeneously distributed throughout the entire foam surface area while not blocking or plugging cells, thereby maximizing surface area and adhesion while minimizing coating agglomerates that may become disadvantageously detached in-use.

The polymeric coating also has a chemical to render the surface hydrophobic so as to attract hydrophobic or hydrophobized mineral particles in the slurry.

The coating may be comprised of a polysiloxane derivative; acrylic polymer; butyl rubber; ethylene vinyl acetate; natural rubber; nitriles; styrene block copolymers with ethylene, propylene, and/or isoprene; polyurethane, and/or polyvinyl ethers. Systems of providing the thin, homogeneous coating throughout an open-cell foam with thickness between 1/32" and 6" and pore size from 5 PPI to 120 PPI (pores per inch) include various embodiments. Each system may be followed with a heater, in certain cases containing added moisture and/or blowers, to accelerate coating cure. In each case where an excess of coating is applied; the gap distance, along with the coating viscosity, coating and foam surface energy, and foam density largely determines the coat weight and thickness. A doctor blade may also be used in these cases in order to meter the coating application. The various embodiments are as follows:

1) Two-roll flooded-nip coater. The two rollers are provided side-by-side horizontally with a thin gap between them. The roller speed and size is independently controlled and may be different for each roller. The roller temperatures are individually controlled. The coating is placed in excess into the roller gap and then the foam is fed into that gap and through the roller system. The gap distance may be as low as 2% of the foam thickness.

2) Spray manifold and roll coater. The coating is sprayed onto each side of the foam in an amount equal to the desired coat weight or higher. The coated foam is then fed between two rollers to distribute the coating homogeneously throughout the foam structure. High viscosity coatings can be diluted to reduce viscosity and make them sprayable. Temperature can be increased to reduce viscosity; however, this should be balanced with the pot life of curable coatings.

3) Extruder and roll coater. The coating is extruded onto one or both surfaces of the foam. The coated foam is then fed between two rollers to distribute the coating homogeneously throughout the foam structure.

4) Porous roll coater. The coating is fed through porous rolls that compress and apply the coating. The porous rolls may be made of metal or ceramic or may be open-celled foams.

5) Immersion coater. The foam is fed through a bulk coating vessel followed by a roller system to eliminate excess coating.

6) Vacuum impregnation. The foam is placed in a bulk coating vessel with vacuum which draws the coating into the foam. The coated foam is then fed between two rollers to distribute the coating homogeneously throughout the foam structure.

7) Metering-roll coaters. Various roll configurations may be used to apply the coating. A pick-up roll may be immersed in the coating material which is then offset onto the coating roll and onto the foam. The coating on a coating roll may be optimized by offsetting onto a metering roll, doctor roll, or doctor blade. A series of rolls can carry the coating from a reservoir to a pick-up roll, transfer roll, the coating roll and onto the foam. Excess coating can be removed by running the coated foam through a back-up roll and a Mayer bar or Wiper bar with the excess dropping back into the reservoir.

Thus, the first aspect of the present invention is a process for coating a substrate comprising a reticulated foam, the process comprising:
    arranging a first roller and a second roller adjacent to each other substantially in a horizontal direction, the second roller and the first roller separated by a gap, the gap having an upper portion and a lower portion;
    positioning the substrate on the upper portion of the gap, the substrate having a substrate thickness greater than the gap;
    providing a coating material onto the substrate, and
    feeding the substrate from the upper portion of the gap through the lower portion of the gap so as to achieve a homogeneous coating of the coating material on the substrate.

According to an embodiment of the present invention, the substrate has two surfaces arranged to contact both the first roller and the second roller simultaneously through the gap.

According to an embodiment of the present invention, the coating material is provided on the upper portion of the gap, and the two surfaces of the substrate are caused to pick up the coating material while the substrate is moved through the upper portion of the gap toward the lower portion of the gap.

According to an embodiment of the present invention, the coating material is sprayed onto the two surfaces of the substrate above the gap.

According to an embodiment of the present invention, the coating material is extruded onto one or both surfaces of the substrate above gap.

According to an embodiment of the present invention, the first roller and the second roller are porous rollers, and wherein the coating material is arranged to load onto the porous rollers so as to cause the coating material on the porous rollers to transfer onto the substrate as part of each rollers is compressed when the substrate is fed from the upper portion through the lower portion of the gap.

According to an embodiment of the present invention, the coating material is contained in a vessel, and the substrate is arranged to move through the vessel to pick up the coating material before the substrate is fed from the upper portion through the lower portion of the gap.

According to an embodiment of the present invention, the coating material is contained in a vacuum chamber and the substrate is arranged to locate in the vacuum chamber in order to draw the coating material onto the substrate before the substrate is fed from the upper portion through the lower portion of the gap.

According to an embodiment of the present invention, the process further comprises one or more rolls arranged to pick up the coating material and to transfer the picked up coating material onto the first roller and the second roller, and wherein the first and second rollers arranged to provide the transferred coating material onto the substrate before the substrate is fed from the upper portion through the lower portion of the gap.

According to an embodiment of the present invention, the coating material is selected from the group consisting of a polysiloxane derivative, acrylic polymer, butyl rubber, ethylene vinyl acetate, natural rubber, nitriles, styrene block copolymers with ethylene, styrene block copolymers with propylene, styrene block copolymers with isoprene, polyurethane and polyvinyl ether.

According to an embodiment of the present invention, the reticulated foam comprises a plurality of pores having a pore size ranging from 5 PPI to 120PPI.

According to an embodiment of the present invention, the reticulated foam has a foam thickness ranged from 1/32" to 6".

According to an embodiment of the present invention, the process further comprises a heater and/or a blower arranged to accelerate curing of the homogeneous coating of the coating material on the substrate.

According to an embodiment of the present invention, the gap has a gap distance ranged from 2% to 50% of the thickness of the substrate.

According to an embodiment of the present invention, the gap has a gap distance which is 2% of the substrate thickness.

According to an embodiment of the present invention, the homogenous coating is further functionalized to be hydrophobic so as to attract mineral particles in a slurry.

The second aspect of the present invent ion is a polymer-coated member configured to contact a slurry containing mineral particles, the polymer-coated member comprising:
 a substrate comprising a reticulated foam having open-cell foam structure, the substrate having two surfaces, the reticulated foam having a foam thickness;
 a polymeric coating disposed on one or both of the two surfaces, the polymeric-coating made from a coating material comprising a polymer to render the polymeric coating compliant and tacky, wherein the substrate is arranged to move through a pair of rollers arranged adjacent to each other substantially in a horizontal direction, the rollers separated from each other by a gap having an upper portion and a lower portion, wherein the coating material is arranged to provide onto the substrate above the gap and the gap is dimensioned to compress the reticulated foam so as to impregnate the open-cell foam structure with the coating material when the substrate is moved from the upper portion of the gap through the lower portion of the gap to achieve the polymeric coating.

According to an embodiment of the present invention, the polymer coating comprises a chemical having a functional group rendering said one or two surfaces hydrophobic so as to attract the miner particles.

According to an embodiment of the present invention, the polymeric coating is modified with a material selected from the group consisting of tackifiers; plasticizers; crosslinking agents; chain transfer agents; chain extenders; adhesion promoters; aryl or alky copolymers; fluorinated copolymers and/or additives; hydrophobizing agents such as hexamethyldisilazane; inorganic particles such as silica, hydrophobic silica, and/or fumed hydrophobic silica; MQ resin; and/or other additives to control and modify the properties of the polymer.

According to an embodiment of the present invention, the polymeric coating is further modified with a chemical selected from the group consisting of with alkyl, aryl, and/or fluorinated functionalities; silica-based additives and other inorganics such as clays and/or bentonite; low molecular weight and oligomeric plasticizers; degrees of crosslinking density and branchedness (polymer structure); and/or POSS materials.

According to an embodiment of the present invention, the polymeric coating has a thickness ranged from 0.3 mils to 1.0 mils.

According to an embodiment of the present invention, the compliant and tacky surface has a tacky scale as measured by loop track against polished stainless steel using PSTC-16 Method A with loop tack in a range of 5 to 600 grams-force.

According to an embodiment of the present invention, the polymeric coating is reacted with additional functionality including oxyhydryl, sulfhydryl, or cationic functionality found in mineral collectors.

According to an embodiment of the present invention, the substrate may take the form of a flat surface, a belt, a bead, a mesh, a filter, or an impeller. Each of the belt, bead, mesh, filter and impeller may have a surface or the entire body made of an open-cell foam.

According to an embodiment of the present invention, the substrate can be an open-cell foam made from reticulated polyurethane.

According to an embodiment of the present invention, the substrate comprises an open-cell foam made from a material selected from the group consisting of silicone, polychloroprene, polyisocyanurate, polystyrene, polyolefin, polyvinylchloride, epoxy, latex, fluoropolymer, phenolic, EPDM, and nitrile.

According to an embodiment of the present invention, the substrate comprises a three-dimensional open cellular structure made of hard plastic.

According to an embodiment of the present invention, the minerals comprise sulfide-based materials such as copper, gold, lead, zinc, nickel and iron.

According to an embodiment of the present invention, the minerals are further hydrophobized by addition of collector chemicals to the aqueous slurry, such as xanthate, dithiophosphate, dithiophosphinate, dithiocarbamate, thionocarbamate, hydroxamates, amine ethers, primary amines, fatty acids and their salts.

The present invention will become apparent upon reading the description in conjunction with FIGS. 1a to 14.

BRIEF DESCRIPTION OF THE DRAWINGS

FIG. 1 includes FIG. 1a and FIG. 1b, where FIG. 1a is a side partial cutaway view in diagram form of a separation processor configured with two chambers, tanks or columns having a functionalized polymer coated impeller arranged therein according to some embodiments of the present invention, and FIG. 1b is a top partial cross-sectional view in diagram form of a functionalized polymer coated impeller moving in an attachment rich environment contained in an attachment chamber, tank or column and also moving in a release rich environment contained in a release chamber, tank or column according to some embodiments of the present invention.

FIG. 4a shows a part of a generalized substrate, e.g., a member to be coated with the polymer, according to an embodiment of the present invention.

FIG. 4b shows a part of another member to be coated with the polymer, according to another embodiment of the present invention.

FIG. 4c illustrates a part of the member to be coated, according to a different embodiment of the present invention.

FIG. 4d illustrates a part of the member to be coated, according to yet another embodiment of the present invention.

FIG. 7 illustrates a filter placed in a tailings pond to collect valuable material according to some embodiments of the present invention.

DETAILED DESCRIPTION OF THE INVENTION

Figure 2:
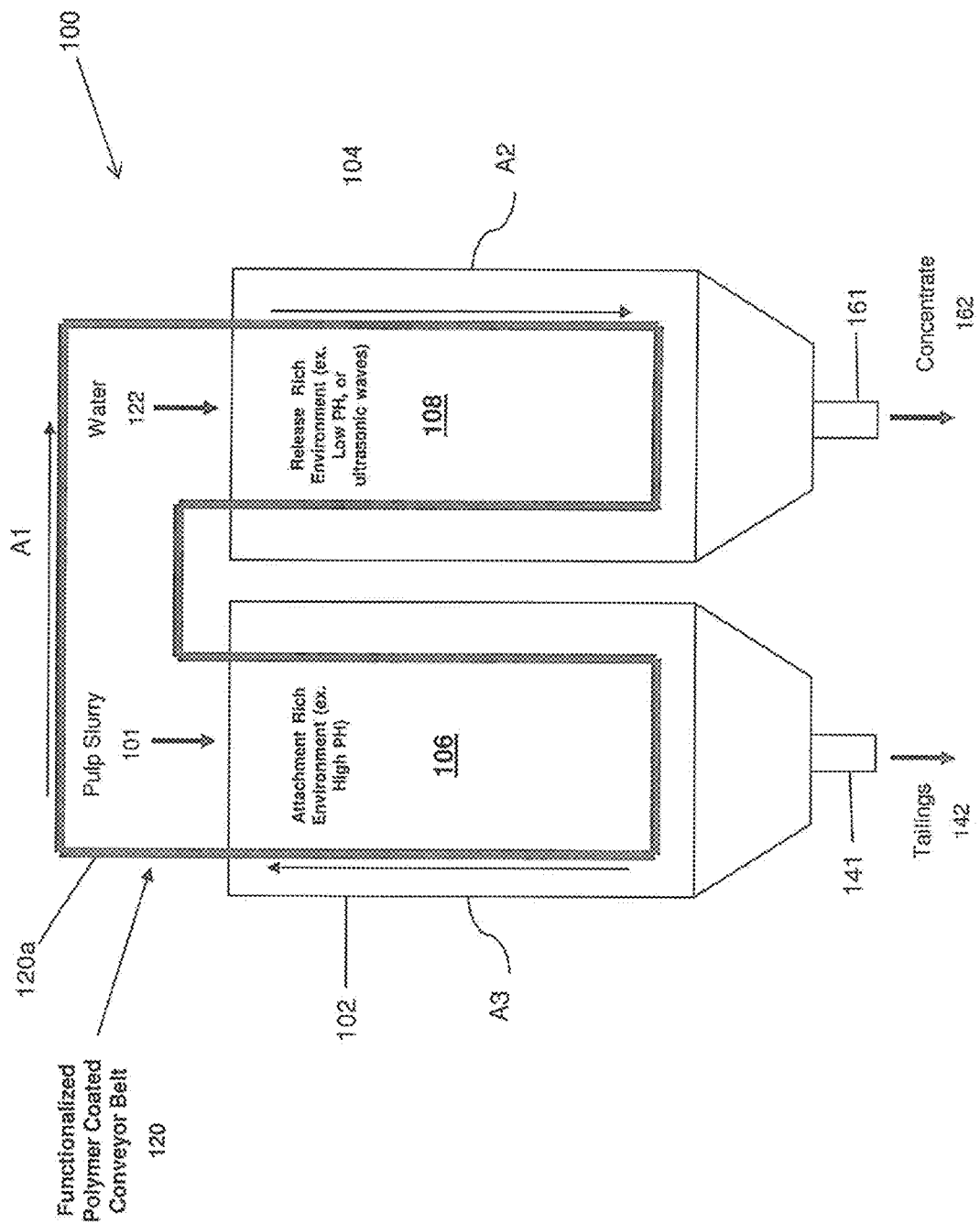
FIG. 2 is diagram of a separation processor configured with two chambers, tanks or columns having a functionalized polymer coated conveyor belt arranged therein according to some embodiments of the present invention.

The present invention provides an apparatus for use in an aqueous slurry containing minerals and unwanted materials. The minerals include hydrophobic or hydrophobized mineral particles. The apparatus comprises a substrate arranged to contact with the aqueous slurry and a polymeric coating disposed on the substrate. The polymeric coating has a compliant and tacky surface. The polymeric coating further comprises a chemical to render the surface hydrophobic so as to attract the hydrophobic or hydrophobized mineral particles.

According to an embodiment of the present invention, the polymeric coating provides a compliant, tacky surface of low energy to enhance selective collection of hydrophobic and hydrophobized particles ranging widely in particle size when distributed in an aqueous slurry. For example, the polymeric coating may be mounted on a substrate, such as a flat surface, belt, bead, mesh, filter, open cell foam structure, or other substrate.

By way of further example, open cell foam structures are disclosed in commonly owned U.S. Provisional Application Nos. 62/276,051, filed Jan. 7, 2016 and 62/405,569, filed Oct. 5, 2016, which are all also hereby incorporated by reference in their entirety.

By way of still further example, PDMS coating and other media coating materials are disclosed in commonly owned PCT application no. PCT/US2015/33485, filed 1 Jun. 2015, U.S. Pat. Nos. 9,352,335 and 9,731,221, which are all hereby incorporated by reference in their entirety.

As disclosed in the above references, the substrate coated with the polymeric coating may be disposed within the aqueous slurry for interaction with, and selective collection of, hydrophobic and hydrophobized particles. The aqueous slurry contains the hydrophobic and/or hydrophobized particles and may also contain unwanted particles that are less hydrophobic or are hydrophilic. For example, in the mining industry, aqueous mining slurries contain a mixture of minerals and other materials The other materials in the slurry are typically referred to as "gangue materials," and include various natural elements found in a mining deposit, such as sands, clays and other materials. Typically, the minerals and gangue material are ground to an average particle size. For example, depending on the mineral type, the average particle size of the mixture of minerals and gangue materials may range from fines of only several microns to coarse particles of greater than 800 microns. The ground minerals and gangue may be mixed with water to create the aqueous slurry. The minerals may be sulfide based minerals, such as copper, gold, lead, zinc, nickel, iron or other mineral. However, other minerals may be collected with the system of the present invention. Additionally, the minerals may be further hydrophobized by the addition of collector chemicals to the aqueous slurry, such as xanthate, dithiophosphate, dithiophosphinate, dithiocarbamate, thionocarbamate, hydroxamates, amine ethers, primary amines, fatty acids and their salts, and petroleum based collector chemistries commonly known in the mining industry. Additionally, where there is a mixture of hydrophobic and hydrophobized particles to be collected, together with other materials, such as gangue, within the slurry, depressants may be added to the aqueous slurry to reduce the hydrophobicity of the gangue materials or other materials that are not desired to be collected by the polymeric coating. Examples of common depressants include cyanide, zinc sulfate, sulfur dioxide, sodium hydrosulfide, sodium sulfide, Nokes reagent, phosphates, diethylenetriamine, triethylenetetramine, certain amphiphilic polymers often based on polyacrylamide, and natural products such as starch, dextrin, CMC, tannin, quebracho, and lignosulfonates.

The polymer of the polymeric coating may be comprised of a polysiloxane derivative, such as, but not limited to, polydimethylsiloxane. The polymer may be modified with: tackifiers; plasticizers; crosslinking agents; chain transfer agents; chain extenders; adhesion promoters; aryl or alky copolymers; fluorinated copolymers and/or additives; hydrophobizing agents such as hexamethyldisilazane; inorganic particles such as silica, hydrophobic silica, and/or fumed hydrophobic silica; MQ resin; and/or other additives to control and modify the properties of the polymer.

In another embodiment of the present invention, the coating may be comprised of other materials typically known as pressure sensitive adhesives, including, but not limited to: acrylics; butyl rubber; ethylene vinyl acetate; natural rubber; nitriles; styrene block copolymers with ethylene, propylene, and/or isoprene; polyurethanes; and polyvinyl ethers.

The materials listed above are formulated to be compliant and tacky with low surface energy. All of these polymers may be mono-, bi-, or multi-modal, and such materials may be modified with alkyl, aryl, and/or fluorinated functionalities; silica-based additives and other inorganics such as clays and/or bentonite; low molecular weight and oligomeric plasticizers; degrees of crosslinking density and branchedness (polymer structure); and/or POSS materials.

The modification in each case is to lower the surface energy and/or optimize compliance and tack. Very effective coatings were prepared from various modified silicones, acrylics, and ethylene vinyl acetate; however, all of the aforementioned polymers are effective if properly prepared to include the desired qualities of lower surface energy, compliance and tack.

The compliance of the coating is a factor in determining the collection efficiency of the hydrophobic particles on the coating as well as the distribution of particle sizes collected on the coating. A fully non-compliant hardened coating will not collect or only have very limited collection of fines (small micron size particles) whereas an extremely soft coating, while collecting a large range of particles, lacks the cohesion to durably remain on its substrate in repeated use. A moderately compliant coating allows particle adhesion while also possessing the cohesion necessary to remain on the substrate. The cohesion of the coating is directly related to the durability of the coating—the greater the cohesion of a particular coating, the greater the durability of that coating. Compliance is also affected by coating thickness; therefore, coating thickness is also an important parameter in hydrophobic particle collection efficiency. It is known that upon contact with a compliant surface, the compliance or "give" of the surface may allow greater surface to surface contact between the compliant surface and the object that comes in contact with the compliant surface. In contrast, a non-compliant, or hard, surface would not provide as much compliance, or give, when in contact with another object, providing less potential surface contact. The coating of the present invention is designed to include a compliant surface that provides increased surface area contact between the coating and a particle that comes in contact with the compliant coating; thereby enhancing adhesion forces. Coating thickness may be as low as 0.3 mils and greater than 1.0 mils, but is preferably greater than 0.75 mils (1 mils=25.4 microns). In general, coatings with low compliance preferentially collect smaller particle sizes while coatings with higher compliance collect a larger distribution of particle sizes.

Hydrophobic, compliant coatings have been prepared with minimal tack that exhibit particle collection; however, enhanced collection is generally achieved when the coating is tacky as measured by loop tack against polished stainless steel using PSTC-16 Method A. Loop tack is preferably greater than 5 grams-force, more preferably greater than 50 grams-force, and most preferably greater than 100 grams-force. Very effective coatings were prepared with loop tack of 300-600 grams-force.

The polymeric coating may be reacted with additional functionality allowing it to bond directly with a particle of interest. This functionality could include oxyhydryl, sulfhydryl, or cationic functionality found in mineral collectors.

The aforementioned coatings may be applied to any substrate effective in slurry processing. Substrates that may be coated include solid, hollow, or network structures made of glass, metal, ceramic, or polymer that may be smooth or have rough surface morphology to improve coating adhesion and/or to increase surface area. The substrate may be comprised of open-cell foam comprised of reticulated polyurethane or another appropriate open-cell foam material such as silicone, polychloroprene, polyisocyanurate, polystyrene, polyolefin, polyvinylchloride, epoxy, latex, fluoropolymer, phenolic, EPDM, nitrile, composite foams and such. The substrate may be comprised of other three-dimensional open cellular structures such as hard plastics, ceramics, carbon fiber, and metals may be used. Examples include Incofoam®, Duocel®, metal and ceramic foams produced by American Elements®, and porous hard plastics such as polypropylene honeycombs and such. The three-dimensional, open cellular structure may itself form a compliant, tacky surface of low energy by, for example, forming such a structure directly from the coating polymers as described above.

The coated substrate must contact the aqueous slurry, be removed from the slurry, and then the hydrophobic particles removed from the coated substrate to recover the valuable particles. This contact could occur within a flotation cell, an agitated tank, a tumbler or some other such known method of contact. The particle-rich coated substrate is then removed from the contactor and washed and/or blown to remove unwanted, unadhered gangue materials. Once any gangue material is removed, the hydrophobic particle laden substrate may be further processed to collect the attached materials, such as attached minerals, for further processing.

Hydrophobic mineral particles of interest may include but not be limited to hydrophobic and/or hydrophobicized metallic or nonmetallic mineral particles, coal particles, diamond particles, or any hydrophobic particles of value.

The three-dimensional open-cell structure may include pores ranging from 5-200 pores per inch.

The substrate may include, or take the form of, a reticulated foam block providing the three-dimensional open-cell structure.

The substrate may include a filter providing the three-dimensional open-cell structure, the structure having open cells to allow fluid in the aqueous mixture to flow through the filter.

The substrate may include a conveyor belt having a surface configured with the three-dimensional open-cell structure.

The substrate may include different open cell foams having different specific surface areas that are blended to recover a specific size distribution of mineral particles in the slurry.

Open Cell Foam and its Characteristics

The three-dimensional open-cell structure may take the form of open cell foam. The open cell foam may be made from a material or materials selected from a group that includes polyester urethanes, polyether urethanes, reinforced urethanes, composites like PVC coated PU, non-urethanes, as well as metal, ceramic, and carbon fiber foams and hard, porous plastics, in order to enhance mechanical durability.

The open cell foam may be coated with polyvinylchloride, and then coated with a compliant, tacky polymer of low surface energy in order to enhance chemical and mechanical durability.

The open cell foam may be primed with a high energy primer prior to application of a functionalized polymer coating to increase the adhesion of the functionalized polymer coating to the surface of the open cell foam.

The surface of the open cell foam may be chemically or mechanically abraded to provide "grip points" on the surface for retention of the functionalized polymer coating.

The surface of the open cell foam may be treated with a coating that covalently bonds to the surface to enhance the adhesion between the functionalized polymer coating and the surface.

The surface of the open cell foam may be coated with a functionalized polymer coating in the form of a compliant, tacky polymer of low surface energy and a thickness selected for capturing certain mineral particles and collecting certain particle sizes, including where thin coatings are selected for collecting proportionally smaller particle size fractions and thick coatings are selected for collecting additional large particle size fractions.

The specific surface area may be configured with a specific number of pores per inch that is determined to target a specific size range of mineral particles in the slurry.

Embodiment of Mineral Separation Apparatus

In its broadest sense, the present invention may take the form of a machine, system or apparatus featuring a first processor and a second processor. The first processor may be configured to receive a mixture of fluid, valuable material and unwanted material and a functionalized polymer coated member configured to attach to the valuable material in an attachment rich environment, and provide an enriched functionalized polymer coated member having the valuable material attached thereto. The second processor may be configured to receive a fluid and the enriched functionalized polymer coated member in a release rich environment to release the valuable material, and provide the valuable material released from the enriched functionalized polymer coated member to the release rich environment.

The apparatus may be configured to include one or more of the following features:

The first processor may take the form of a first chamber, tank, cell or column, and the second processor may take the form of a second chamber, tank, cell or column.

The first chamber, tank or column may be configured to receive a pulp slurry having water, the valuable material and the unwanted material in the attachment rich environment, which has a high pH, conducive to attachment of the valuable material.

The second chamber, tank or column may be configured to receive water in the release rich environment, which may have a low pH or receive ultrasonic waves conducive to release of the valuable material.

Although the invention is described as having a high pH in an attachment environment and a low pH in a release environment, the present invention will work equally as well where the pH of the attachment environment is selected to optimize the attachment of desired materials, such as a low, high or neutral pH, and the pH of the release environment is selected to be a different pH than the attachment environment and selected to optimize the release of the desired material.

The functionalized polymer coated member may take the form of a functionalized polymer coated impeller having at least one impeller blade configured to rotate slowly inside the first processor and the second processor. The first processor may be configured to receive the at least one impeller blade in an attachment zone, and provide at least one enriched impeller blade having the valuable material attached thereto in the attachment zone. The second processor may be configured to receive the at least one enriched impeller blade in a release zone and to provide the valuable material released from the at least one enriched impeller blade. The first processor may be configured with a first transition zone to provide drainage of tailings, and the second processor may be configured with a second transition zone to provide drainage of concentrate.

As used herein with respect to functionalized polymer, the term "enriched" is intended to refer to a functionalized material that has been exposed to a material of interest, and wherein the material of interest has been attached, attracted, connected or otherwise collected by the functionalized material prior to release.

The functionalized polymer coated member may take the form of a functionalized polymer coated conveyor belt configured to run between the first processor and the second processor. The first processor may be configured to receive the functionalized polymer coated conveyor belt and provide an enriched functionalized polymer coated conveyor belt having the valuable material attached thereto. The second processor may be configured to receive the enriched functionalized polymer coated conveyor belt and provide the valuable material released from the enriched functionalized polymer coated conveyor belt. The functionalized polymer coated conveyor belt may be made of a mesh material.

The functionalized polymer coated member may take the form of a functionalized polymer coated collection filter configured to move between the first processor and the second processor as part of a batch type process. The first processor may be configured to receive the functionalized polymer coated collection filter and to provide an enriched functionalized polymer coated collection filter having the valuable material attached thereto. The second processor device may be configured to receive the enriched functionalized polymer coated collection filter and provide the valuable material released from the enriched functionalized polymer coated collection filter.

The first processor may be configured to provide tailings containing the unwanted material, and the second processor may be configured to provide a concentrate containing the valuable material.

The functionalized polymer coated member may take the form of a membrane or a thin soft pliable sheet or layer.

According to some embodiment, the present invention may also take the form of apparatus featuring first means that may be configured to receive a mixture of fluid, valuable material and unwanted material and a functionalized polymer coated member configured to attach to the valuable material in an attachment rich environment, and provide an enriched functionalized polymer coated member having the valuable material attached thereto; and second means that may be configured to receive a fluid and the enriched functionalized polymer coated member in a release rich environment to release the valuable material, and provide the valuable material released from the enriched functionalized polymer coated member to the release rich environment.

According to some embodiments of the present invention, the first means may be configured to receive a pulp slurry having water, the valuable material and the unwanted material in the attachment rich environment, which has a high pH, conducive to attachment of the valuable material; and the second means may be configured to receive water in the release rich environment, which has a low pH or receives ultrasonic waves conducive to release of the valuable material.

According to some embodiments of the present invention, the functionalized polymer coated member may take the form of one of the following:
  a functionalized polymer coated impeller having at least one impeller blade configured to rotate slowly inside the first means and the second means;
  a functionalized polymer coated conveyor belt configured to run between the first means and the second means; or
  a functionalized polymer coated collection filter configured to move between the first means and the second means as part of a batch type process.

Embodiments of Mineral Separation Processes or Methods

According to some embodiment, the present invention may also take the form of a process or method featuring receiving in a first processor a mixture of fluid, valuable material and unwanted material and a functionalized polymer coated member configured to attach to the valuable material in an attachment rich environment, and providing from the first processor an enriched functionalized polymer coated member having the valuable material attached thereto; and receiving in a second processor a fluid and the enriched functionalized polymer coated member in a release rich environment to release the valuable material, and providing the valuable material released from the enriched functionalized polymer coated member to the release rich environment.

According to some embodiments of the present invention, the method may include being implemented consistent with one or more of the features set forth herein.

The Synthetic Functionalized Polymer Coated Member Chemistry

According to some embodiments of the present invention, the functionalized polymer coated member may take the form of a substrate comprising a surface in combination with a plurality of molecules attached to the surface, the molecules comprising a functional group selected for attracting or attaching to one or more mineral particles of interest to the molecules. The term "polymer" in this specification is understood to mean a large molecule made of many units of the same or similar structure linked together.

According to some embodiments of the present invention, the substrate may be made of a synthetic material comprising the molecules. By way of example, the synthetic material may be selected from a group consisting of, but not limited to, polyamides (nylon), polyesters, polyurethanes, phenol-formaldehyde, urea-formaldehyde, melamine-formaldehyde, polyacetal, polyethylene, polyisobutylene, polyacrylonitrile, poly(vinyl chloride), polystyrene, poly(methyl methacrylates), poly(vinyl acetate), poly(vinylidene chloride), polyisoprene, polybutadiene, polyacrylates, poly(carbonate), phenolic resin and polydimethylsiloxane.

According to some embodiments of the present invention, the functional group may have an ionic group, which may be either anionic or cationic, for attracting or attaching the mineral particles to the surface.

According to some embodiments of the present invention, the functional group may take the form of a collector having a non-ionizing bond having a neutral or ionic functional group, or having an ionizing bond.

According to some embodiments of the present invention, the ionizing bond may be an anionic bond or a cationic bond. The anionic functional group may be comprised of an oxyhydryl, including carboxylic, sulfates and sulfonates, and sulfhydral bond.

Hydrophobicity

According to some embodiments of the present invention, the surface of the polymer coated member may be functionalized to be hydrophobic so as to provide a bonding between the surface and a mineral particle associated with one or more hydrophobic molecules.

Furthermore, the polymer can be naturally hydrophobic or functionalized to be hydrophobic. Some polymers having a long hydrocarbon chain or silicon-oxygen backbone, for example, tend to be hydrophobic. Hydrophobic polymers include polystyrene, poly(d,l-lactide), poly(dimethylsiloxane), polypropylene, polyacrylic, polyethylene, etc. The mineral particle of interest or the valuable material associated with one or more hydrophobic molecules is referred to as a wetted mineral particle. When the pulp slurry contains a plurality of collectors or collector molecules, some of the mineral particles will become wetted mineral particles if the collectors are attached to mineral particles. Xanthates can be used in the pulp slurry as the collectors. The functionalized polymer coated member can be coated with hydrophobic silicone polymer including polysiloxanates so that the functionalized polymer coated member become hydrophobic. The functionalized polymer coated member can be made of hydrophobic polymers, such as polystyrene and polypropylene to provide the desired hydrophobicity.

Combined Collector/Hydrophobic Functionalized Polymer Coated Member

According to some embodiments of the present invention, only a part of the surface of the functionalized polymer coated member may be configured to have the molecules attached thereto, wherein the molecules comprise collectors.

According to some embodiments of the present invention, a part of the surface of the functionalized polymer coated member may be configured to have the molecules attached thereto, wherein the molecules comprise collectors, and another part of the surface of the functionalized polymer coated member may be configured to be hydrophobic.

According to some embodiments of the present invention, a part of the surface of the functionalized polymer coated member may be configured to be hydrophobic.

FIGS. 1, 1a, 1b

By way of example, FIG. 1 shows the present invention is the form of a machine, device, system or apparatus 10, e.g., for separating valuable material from unwanted material in a mixture 11, such as a pulp slurry, using a first processor 12 and a second processor 14. FIG. 1 includes FIG. 1a and FIG. 1b, where FIG. 1a is a side partial cutaway view in diagram form of a separation processor configured with two chambers, tanks or columns having a functionalized polymer coated impeller arranged therein according to some embodiments of the present invention, and FIG. 1b is a top partial cross-sectional view in diagram form of a functionalized polymer coated impeller moving in an attachment rich environment contained in an attachment chamber, tank or column and also moving in a release rich environment contained in a release chamber, tank or column. The first processor 12 and the second processor 14 are configured with a functionalized polymer coated member that is shown, e.g., as a functionalized polymer coated impeller 20 (FIG. 1a), 20' (FIG. 1b), according to some embodiments of the present invention. In operation, the impeller 20, 20' slowly rotates in relation to the first processor 12 and the second processor 14, the impeller blades slowly pass through the attachment rich environment 16 in the first processor 12 where the valuable material is attached to the blades and through the release rich environment 18 in the second processor 14 is released from the blades. By way of example, the impeller 20 is shown rotating in a counter-clockwise direction as indicated by arrow a, although the scope of the invention is not intended to be limited to the direction of the impeller rotation, or the manner in which the functionalized polymer coated impeller 20 (FIG. 1a), 20' (FIG. 1b) is arranged, mounted, or configured in relation to the first processor 12 and the second processor 14.

The first processor 12 may take the form of a first chamber, tank, cell or column that contains an attachment rich environment generally indicated as 16. The first chamber, tank or column 12 may be configured to receive via piping 13 the mixture or pulp slurry 11 in the form of fluid (e.g., water), the valuable material and the unwanted material in the attachment rich environment 16, e.g., which has a high pH, conducive to attachment of the valuable material. The second processor 14 may take the form of a second chamber, tank, cell or column that contains a release rich environment generally indicated as 18. The second chamber, tank, cell or column 14 may be configured to receive via piping 15, e.g., water 22 in the release rich environment 18, e.g., which may have a low pH or receive ultrasonic waves conducive to release of the valuable material. Attachment rich environments like that forming part of element environment 16 conducive to the attachment of a valuable material of interest and release rich environments like that forming part of environment 18 conducive to the release of the valuable material of interest are known in the art, and the scope of the invention is not intended to be limited to any particular type or kind thereof either now known or later developed in the future. Moreover, a person skilled in the art would be able to formulate an attachment rich environment like environment 16 and a corresponding release rich environment like environment 18 based on the separation technology disclosed herein for any particular valuable mineral of interest, e.g., copper, forming part of any particular mixture or slurry pulp.

Although the invention is described as having a high pH in an attachment environment and a low pH in a release environment, embodiments are envisioned in which the invention will work equally as well where the pH of the attachment environment is selected to optimize the attachment of desired materials, such as a low, high or neutral pH, and the pH of the release environment is selected to be a different pH than the attachment environment and selected to optimize the release of the desired material.

In operation, the first processor 12 may be configured to receive the mixture or pulp slurry 11 of water, valuable material and unwanted material and the functionalized polymer coated member that is configured to attach to the valuable material in the attachment rich environment 16. In FIG. 1, the functionalized polymer coated member is shown as the functionalized polymer coated impeller 20 (FIG. 1a), 20' (FIG. 1b). In FIG. 1a, the functionalized polymer coated impeller 20 has a shaft 21 and at least one impeller blade 20a, 20b, 20c, 20d, 2e, 20f, 20g and is configured to rotate slowly inside the first processor 12 and the second processor 14. In FIG. 1b, the functionalized polymer coated impeller 20' has a shaft 21' and impeller blades 20a', 20b', 20c', 20d', 2e', 20f', 20g' and 20h'. Each impeller blade in FIG. 1 is understood to be configured and functionalized with a polymer coating to attach to the valuable material in the attachment rich environment 16. (The scope of the invention is not intended to be limited to the number of blades on the impeller 20, 20' and the embodiment in FIGS. 1a and 1b is shown with impellers 21, 21' having a different number of blades.)

In FIG. 1, the first processor 12 is configured to receive at least one impeller blade of the functionalized polymer coated impeller 20 (FIG. 1a), 20' (FIG. 1b). In FIG. 1b, the at least one impeller blade is shown as impeller blade 20g' being received in an attachment zone 30 that forms part of the attachment rich environment 16 defined by walls 30a, 30b. The first processor 12 may also be configured with a first transition zone generally indicated as 40 to provide drainage from piping 41 of, e.g., tailings 42 as shown in FIG. 1a.

The first processor 12 may also be configured to provide at least one enriched impeller blade having the valuable material attached thereto, after passing through the attachment rich environment 16. In FIG. 1b, the at least one enriched impeller blade is shown as the at least one enriched impeller blade 20c' being provisioned from the attachment rich environment 16 in the first processor 12 to the release rich environment 18 in the second processor 14.

The second processor 14 may be configured to receive via the piping 15 the fluid 22 (e.g. water) and the enriched functionalized polymer coated member to release the valuable material in the release rich environment 18. In FIG. 1b, the second processor 14 is shown receiving the enriched impeller blade 20c' in a release zone 50, e.g., that forms part of the release rich environment 18 and is defined, e.g., by walls 30c and 30d.

The second processor 14 may also be configured to provide the valuable material that is released from the enriched functionalized polymer coated member into the release rich environment 18. For example, in FIG. 1b the second processor 14 is shown configured with a second transition zone 60 defined by walls 30a and 30d to provide via piping 61 drainage of the valuable material in the form of a concentrate 62 (FIG. 1a).

FIG. 2: The Functionalized Polymer Coated Conveyor Belt

By way of example, FIG. 2 shows the present invention is the form of a machine, device, system or apparatus 100, e.g., for separating valuable material from unwanted material in a mixture 101, such as a pulp slurry, using a first processor 102 and a second processor 104. The first processor 102 and the second processor 104 are configured with a functionalized polymer coated member that is shown, e.g., as a functionalized polymer coated conveyor belt 120 that runs between the first processor 102 and the second processor 104, according to some embodiments of the present invention. The arrows A1, A2, A3 indicate the movement of the functionalized polymer coated conveyor belt 120. Techniques, including motors, gearing, etc., for running a conveyor belt like element 120 between two processors, such as elements 102 and 104 are known in the art, and the scope of the invention is not intended to be limited to any particular type or kind thereof either now known or later developed in the future. According to some embodiments of the present invention, the functionalized polymer coated conveyor belt 120 may be made of a mesh material.

The first processor 102 may take the form of a first chamber, tank, cell or column that contains an attachment rich environment generally indicated as 106. The first chamber, tank or column 102 may be configured to receive the mixture or pulp slurry 101 in the form of fluid (e.g., water), the valuable material and the unwanted material in the attachment rich environment 106, e.g., which has a high pH, conducive to attachment of the valuable material. The second processor 104 may take the form of a second chamber, tank, cell or column that contains a release rich environment generally indicated as 108. The second chamber, tank, cell or column 104 may be configured to receive, e.g., water 122 in the release rich environment 108, e.g., which may have a low pH or receive ultrasonic waves conducive to release of the valuable material. Consistent with that stated above, attachment rich environments like that forming part of element environment 106 conducive to the attachment of a valuable material of interest and release rich environments like that forming part of environment 108 conducive to the release of the valuable material of interest are known in the art, and the scope of the invention is not intended to be limited to any particular type or kind thereof either now known or later developed in the future. Moreover, a person skilled in the art would be able to formulate an attachment rich environment like environment 106 and a corresponding release rich environment like environment 108 based on the separation technology disclosed herein for any particular valuable mineral of interest, e.g., copper, forming part of any particular mixture or slurry pulp.

In operation, the first processor 102 may be configured to receive the mixture or pulp slurry 101 of water, valuable material and unwanted material and the functionalized polymer coated conveyor belt 120 that is configured to attach to the valuable material in the attachment rich environment 106. In FIG. 2, the belt 120 is understood to be configured and functionalized with a polymer coating to attach to the valuable material in the attachment rich environment 106.

The first processor 102 may also be configured to provide drainage from piping 141 of, e.g., tailings 142 as shown in FIG. 2.

The first processor 102 may also be configured to provide an enriched functionalized polymer coated conveyor belt having the valuable material attached thereto, after passing through the attachment rich environment 106. In FIG. 2, the enriched functionalized polymer coated conveyor belt is shown, e.g., as that portion or part 120a of the belt 120 being provisioned from the attachment rich environment 106 in the first processor 102 to the release rich environment 108 in the second processor 104. It is understood that some other portions or parts of the belt 120 may be enriched, including the portion or part immediately leaving the attachment rich environment 106, as well as the portion or part immediately entering the release rich environment 108.

The second processor 14 may be configured to receive the fluid 122 (e.g. water) and the portion 120a of the enriched functionalized polymer coated conveyor belt 120 to release the valuable material in the release rich environment 108.

The second processor 104 may also be configured to provide the valuable material that is released from the enriched functionalized polymer coated member into the release rich environment 108. For example, in FIG. 2 the second processor 104 is shown configured to provide via piping 161 drainage of the valuable material in the form of a concentrate 162.

In FIG. 2, the first processor 102 is configured with the functionalized polymer coated conveyor belt 120 passing through with only two turns inside the attachment rich environment 106. However, embodiments are envisioned in which the first processor 102 may be configured to process the functionalized polymer coated conveyor belt 120 using a serpentine technique for winding or turning the belt 120 one way and another way, back and forth, inside the first processor to maximize surface area of the belt inside the processor 102 and exposure of the belt 120 to the attachment rich environment 106.

Figure 3:
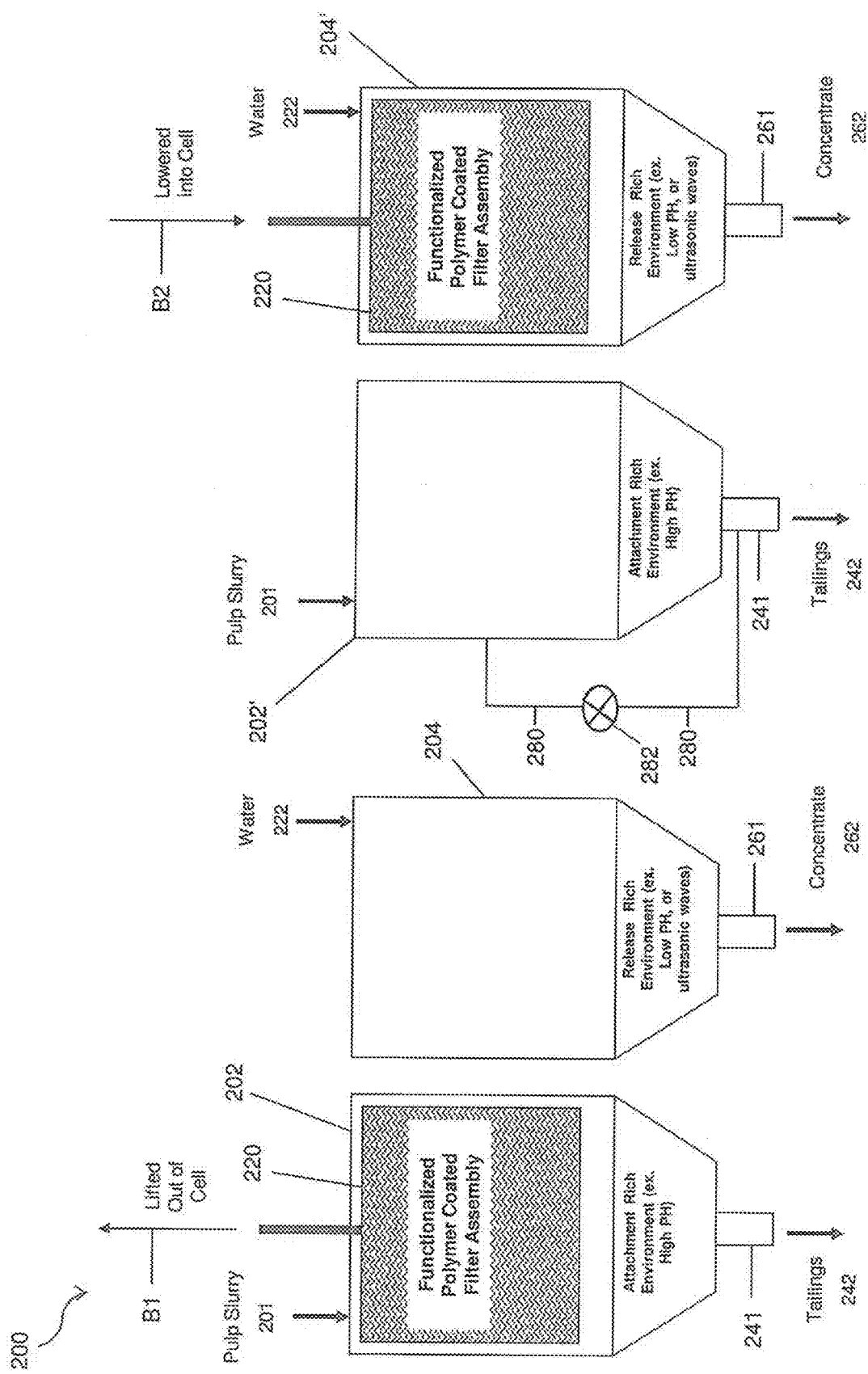
FIG. 3 is diagram of a separation processor configured with a functionalized polymer coated filter assembly for moving between two chambers, tanks or columns in a semi-continuous batch process according to some embodiments of the present invention.

FIG. 3: The Functionalized Polymer Coated Filter

By way of example, FIG. 3 shows the present invention is the form of a machine, device, system or apparatus 200, e.g., for separating valuable material from unwanted material in a mixture 201, such as a pulp slurry, using a first processor 202, 202' and a second processor 204, 204'. The first processor 202 and the second processor 204 are configured to process a functionalized polymer coated member that is shown, e.g., as a functionalized polymer coated collection filter 220 configured to be moved between the first processor 202 and the second processor 204' as shown in FIG. 3 as part of a batch type process, according to some embodiments of the present invention. In FIG. 3, by way of example the batch type process is shown as having two first processors 202, 202' and second processors 204, 204, although the scope of the invention is not intended to be limited to the number of first or second processors. Moreover, embodiments are envisioned using a different number of first and second processors, different types or kinds of processors, as well as different types or kinds of processors both now known or later developed in the future. According to some embodiments of the present invention, the functionalized polymer coated collection filter 220 may take the form of a membrane or a thin soft pliable sheet or layer. The arrow B1 indicates the movement of the functionalized polymer coated filter 220 from the first processor 202, and the arrow B2 indicates the movement of the functionalized polymer coated collection filter 220 into the second processor 202. Techniques, including motors, gearing, etc., for moving a filter like element 220 from one processor to another processor like elements 202 and 204 are known in the art, and the scope of the invention is not intended to be limited to any particular type or kind thereof either now known or later developed in the future.

The first processor 202 may take the form of a first chamber, tank, cell or column that contains an attachment rich environment generally indicated as 206. The first chamber, tank or column 102 may be configured to receive the mixture or pulp slurry 201 in the form of fluid (e.g., water), the valuable material and the unwanted material in the attachment rich environment 206, e.g., which has a high pH, conducive to attachment of the valuable material. The second processor 204 may take the form of a second chamber, tank, cell or column that contains a release rich environment generally indicated as 208. The second chamber, tank, cell or column 204 may be configured to receive, e.g., water 222 in the release rich environment 208, e.g., which may have a low pH or receive ultrasonic waves conducive to release of the valuable material. Consistent with that stated above, attachment rich environments like that forming part of element environment 206 conducive to the attachment of a valuable material of interest and release rich environments like that forming part of environment 208 conducive to the release of the valuable material of interest are known in the art, and the scope of the invention is not intended to be limited to any particular type or kind thereof either now known or later developed in the future. Moreover, a person skilled in the art would be able to formulate an attachment rich environment like environment 206 and a corresponding release rich environment like environment 208 based on the separation technology disclosed herein for any particular valuable mineral of interest, e.g., copper, forming part of any particular mixture or slurry pulp.

In operation, the first processor 202 may be configured to receive the mixture or pulp slurry 101 of water, valuable material and unwanted material and the functionalized polymer coated collection filter 220 that is configured to attach to the valuable material in the attachment rich environment 206. In FIG. 3, the functionalized polymer coated collection filter 220 is understood to be configured and functionalized with a polymer coating to attach to the valuable material in the attachment rich environment 106.

The first processor 202 may also be configured to provide drainage from piping 241 of, e.g., tailings 242 as shown in FIG. 3.

The first processor 202 may also be configured to provide an enriched functionalized polymer coated collection filter having the valuable material attached thereto, after soaking in the attachment rich environment 106. In FIG. 3, the enriched functionalized polymer coated collection filter 220 is shown, e.g., being provisioned from the attachment rich environment 206 in the first processor 202 to the release rich environment 208 in the second processor 204.

The second processor 204 may be configured to receive the fluid 222 (e.g. water) and the enriched functionalized polymer coated collection filter 220 to release the valuable material in the release rich environment 208.

The second processor 204 may also be configured to provide the valuable material that is released from the enriched functionalized polymer coated collection filter 220 into the release rich environment 208. For example, in FIG. 3 the second processor 204 is shown configured to provide via piping 261 drainage of the valuable material in the form of a concentrate 262.

The first processor 202' may also be configured with piping 280 and pumping 280 to recirculate the tailings 242 back into the first processor 202'. The scope of the invention is also intended to include the second processor 204' being configured with corresponding piping and pumping to recirculate the concentrate 262 back into the second processor 204'. Similar recirculation techniques may be implemented for the embodiments disclosed in relation to FIGS. 1-2 above.

The scope of the invention is not intended to be limited to the type or kind of batch process being implemented. For example, embodiments are envisioned in which the batch process may include the first and second processors 202, 204 being configured to process the enriched functionalized polymer coated collection filter 220 in relation to one type or kind of valuable material, and the first and second processors 202', 204' being configured to process the enriched functionalized polymer coated collection filter 220 in relation to either the same type or kind of valuable material, or a different type or kind of valuable material. Moreover, the scope of the invention is intended to include batch processes both now known and later developed in the future.

It should be noted that the functionalized polymer coated member of the present invention can be realized by a different way to achieve the same goal. Namely, it is possible to use a different means to attract the mineral particles of interest to the surface of the functionalized polymer coated member. For example, the surface of the polymer coated member can be functionalized with a hydrophobic chemical molecule or compound, as discussed below. Alternatively, the surface of the functionalized polymer coated member can be coated with hydrophobic chemical molecules or compounds. In the pulp slurry, xanthate and hydroxamate collectors can also be added therein for collecting the mineral particles and making the mineral particles hydrophobic. When the functionalized polymer coated member is used to collect the mineral particles in the pulp slurry having a pH value around 8-9, it is possible to release the mineral particles on the enriched synthetic beads from the surface of the functionalized polymer coated member in an acidic solution, such as a sulfuric acid solution. According to some embodiment, it may also be possible to release the mineral particles carried with the enriched functionalized polymer coated member by sonic agitation, such as ultrasonic waves, or simply by washing it with water.

FIGS. 4a-4f

According to some embodiments of the present invention, the foam or sponge can take the form of a filter, a membrane or a conveyor belt as described in PCT application no. PCT/US12/39534, entitled "Mineral separation using functionalized membranes;" filed 21 May 2012, which is hereby incorporated by reference in its entirety. A porous material, foam or sponge may be generalized as a material with three-dimensional open-cellular structure, an open-cell foam or reticulated foam, which can be made from soft polymers and may include a hydrophobic chemical having molecules to attract and attach mineral particles to the surfaces of the polymer-coated substrate.

Open-cell foam or reticulated foam offers an advantage over non-open cell materials by having higher surface area to volume ratio. Applying a functionalized polymer coating that promotes attachment of mineral to the foam "network" enables higher mineral recovery rates and also improves recovery of less liberated mineral than conventional process. For example, the open cells in an engineered foam block allow passage of fluid and particles smaller than the cell size but captures mineral particles that come in contact with the functionalized polymer coating on the open cells. This also allows the selection of cell size dependent upon slurry properties and application.

According to some embodiments of the present invention, the substrate takes the form of an open-cell foam/structure in a rectangular block or a cubic shape 70a as shown in FIG. 4a.

Figure 4F:
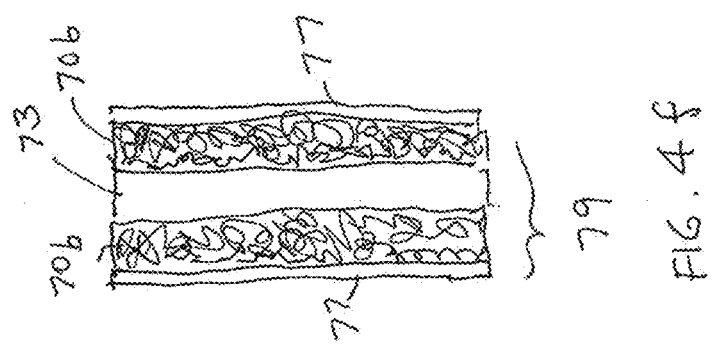
FIG. 4f illustrates a polymeric-coated substrate having a member as shown in FIG. 4d.
Figure 5:
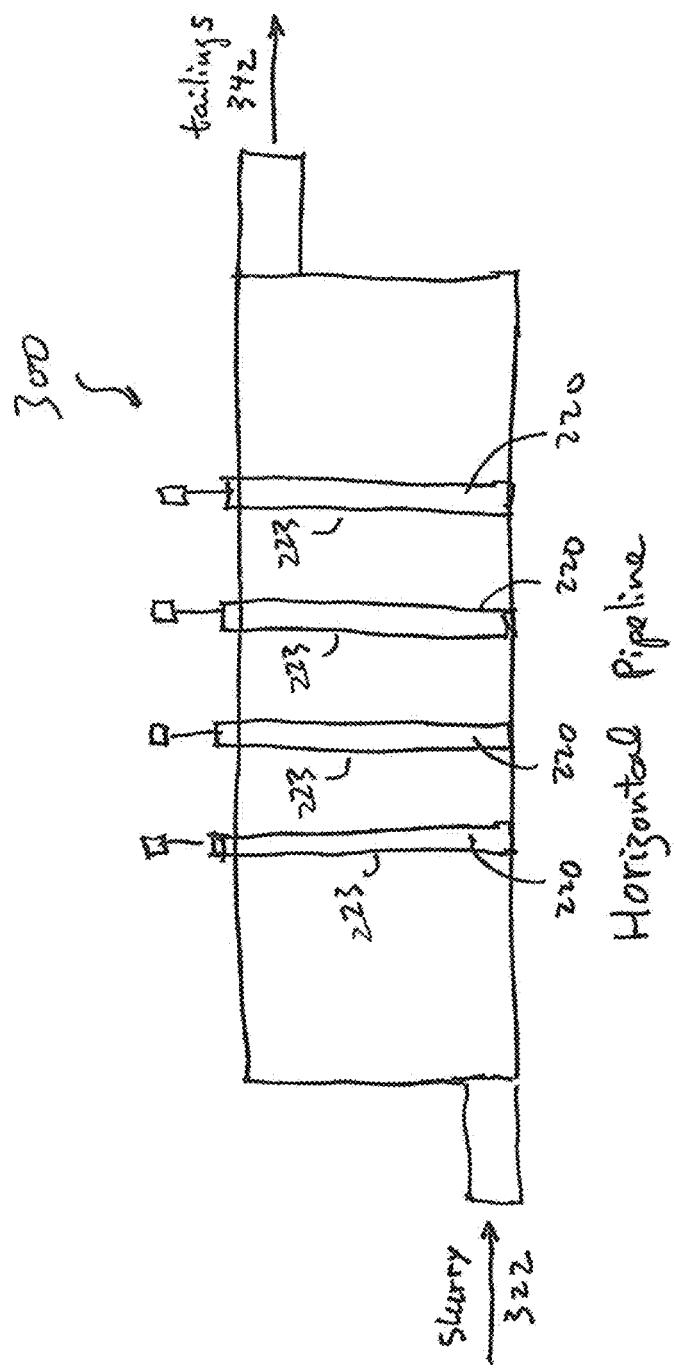
FIG. 5 illustrates a plurality of filters placed in a horizontal pipeline to collect mineral particles, according to some embodiments of the present invention.

According to some embodiments of the present invention, the substrate may take the form of a filter 70b with a three-dimensional open-cell structure as shown in FIG. 4b. The filter 70b can be used in a filtering assembly 220 as shown in FIG. 5, for example.

According some embodiments of the present invention, the substrate may take the form of a membrane 70c, a section of which is shown in FIG. 4c. As seen in FIG. 4c, the membrane 70c can have an open-cell foam layer or filter 70b attached to a base or backing member 73. The backing member can be made from a material which is less porous than the open-cell foam layer. For example, the backing member can be a sheet of pliable polymer to enhance the durability of the membrane. The membrane 70c can be used as a conveyor belt as shown in FIG. 2, for example.

According some embodiments of the present invention, the substrate may take the form of a membrane 70d, a section of which is shown in FIG. 4d. As seen in FIG. 4d, the membrane 70d can have two open-cell foam layers or filters 70b attached to two sides of a backing member 73. The backing member 73 can made of a material which is less porous than the open-cell foam layer. The membrane 70d can also be used as a conveyor belt as shown in FIG. 2, for example.

Figure 4E:
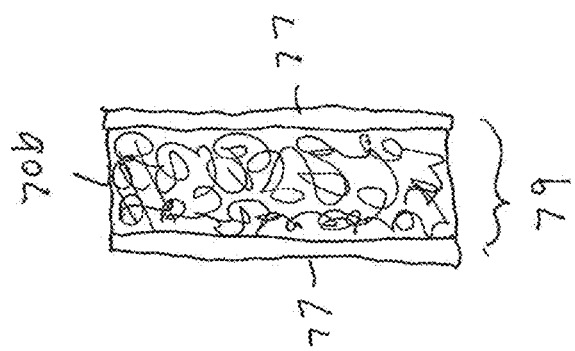
FIG. 4e illustrates a polymeric-coated substrate having a member as shown in FIG. 4b.

An example of the polymer-coated member is shown in FIG. 4e. As shown in FIG. 4e, the polymer-coated member 79 comprises an open-cell foam layer 70b and two polymeric coatings 77. Another example of the polymer-coated member is shown in FIG. 4f. As shown in FIG. 4f, the polymer-coated member 79 comprises a membrane 70d and two polymeric coatings 77.

FIGS. 5-7

The mineral particle or the valuable material associated with one or more amphiphilic collector molecules is referred to as a wetted mineral particle. When the pulp slurry contains a plurality of collectors or collector molecules, some of the mineral particles will become wetted mineral particles if the collectors are attached to mineral particles, thus making the surface of the mineral particles hydrophobic. Xanthates can be used in the pulp slurry as the collectors.

In effect, the key mechanism for the materials is the combination of hydrophobicity, tackiness and compliance. By way of example, according to some embodiments of the present invention, the mechanism works as follows:

1. The hydrophobicity of the surface provides the selectivity. When in the water based solution, the hydrophobic surface attracts the hydrophobic minerals of interest, and rejects the non-hydrophobic gangue materials.

2. As the hydrophobic material is removed from the solution, the tackiness of the material maintains the contact and "grip" on the collected hydrophobic minerals (which would otherwise fall off because there is no hydrophobic action to hold them in place after withdrawal from the solution).

3. Compliance is also a key component. Material compliance is essential to allow surface area contact in hydrophobic conditions, and further to allows surface area contact under tacky conditions after withdrawal from the solution. This may also be due at least in part to Van der Waals forces.

4. Another important feature is durability, with the understanding that there may be a tradeoff between durability and compliance and/or tackiness. One typically may want durability if one intends to reuse the materials (to make the process cost effective), but if one make the material too durable, one may lose either the compliance and/or tackiness feature of the material, thus the trade-off.

It should be understood that, when the collection area of the impeller 20 (FIGS. 1a, 1b), the collection area of the conveyor belt 120 (FIG. 2) and the collection area 223 of the filter 220 (FIG. 6) are functionalized to be hydrophobic, the pulp slurry 11 (FIG. 1a), the pulp slurry 101 (FIG. 2) and the pulp slurry 201 (FIG. 3) may be mixed with collector molecules such as xanthates so that the mineral particles in the slurry may be hydrophobically modified with the collector molecules to become wetted mineral particles.

Figure 6:
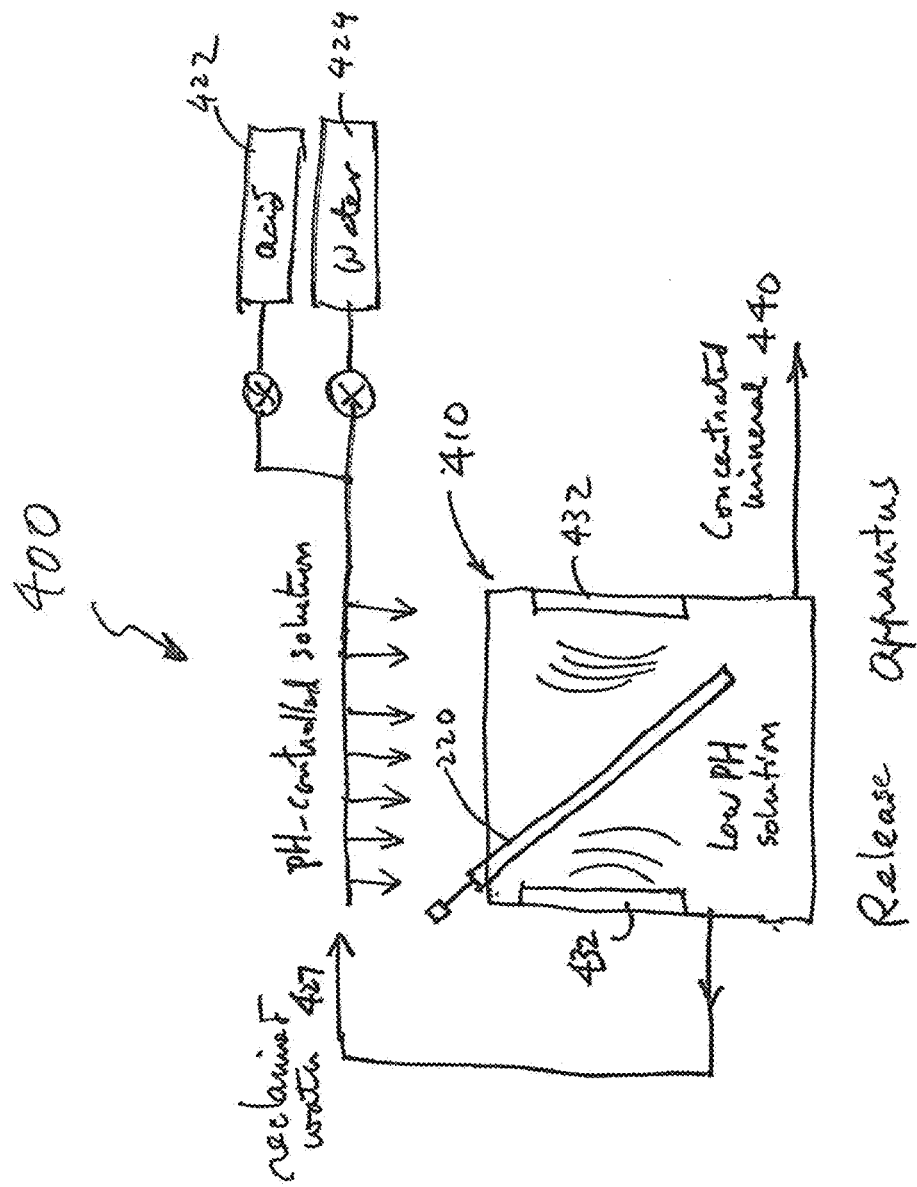
FIG. 6 illustrates a release apparatus configured to release mineral particles from a filter, according to some embodiments of the present invention.

In a different embodiment of the present invention, the impeller 20 (FIG. 1a), the conveyor belt 120 (FIG. 2) and the filter 220 (FIG. 3) are used in a horizontal pipeline for mineral separation. Furthermore, a group of filters 220 can be used in a first processor 202 as shown in FIG. 3. By way of example, a plurality of filters 220 are placed into a horizontal pipeline 300 to collect the valuable material in the slurry 322, as shown in FIG. 5. As the slurry passes through the filters 220, some of the mineral particles in the slurry will become attached to collection area 223 and the openings. With such an arrangement, one or more of the filters 220 can be taken out of the horizontal pipeline 300 for mineral releasing (see FIG. 6) while other filters 220 continue to collect the mineral particles. The tailings 342 can be discharged or transported to a tailings pond or the like (see FIG. 7). The attached mineral particles on the filter 220 can be released in a release rich environment with a low pH solution and/or ultrasonic agitation. The pH value of the low pH solution can be 0 to 7, for example. As shown in FIG. 6, the filter 220 with collected mineral particles can be placed in a releasing apparatus 410 to be washed with a mixture of acid and water provided by water container 424 and acid container 422. One or more ultrasonic sources 432 may be used to shake loose the attached mineral particles from the filter 220.

FIGS. 8-15

The present invention provides a number of coating systems for applying a polymeric coating onto one or both sides of a substrate to achieve a polymer-coated member (see FIGS. 4e and 4f, for example). The polymeric-coating provides a compliant, tacky surface of low energy in order to enhance selective collection of hydrophobic and hydrophobized mineral particles ranged widely in particle size when distributed in an aqueous slurry. In one embodiment of the present invention, the polymeric-coating is functionalized to become hydrophobic.

To demonstrate how the substrate is coated with the polymeric coating material, an open-cell foam filter 70, such as the filter 70b as shown in FIG. 4b is used as the substrate.

Figure 8:
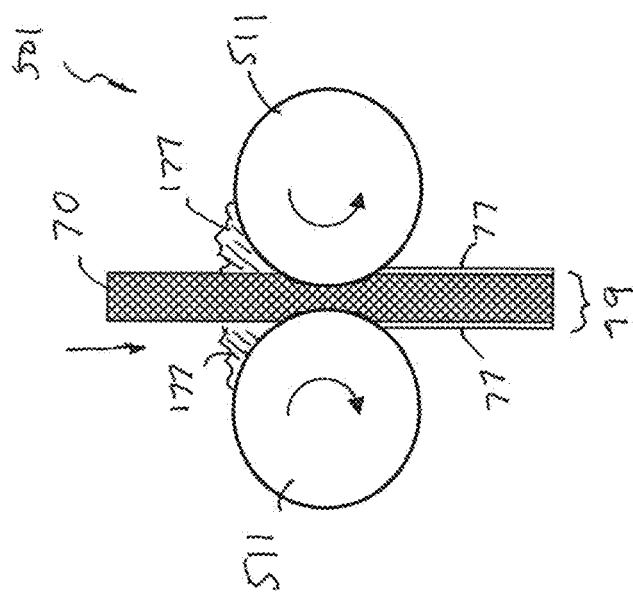
FIG. 8 illustrates a two-roll flooded-nip coater, according an embodiment of the present invention.

FIG. 8 illustrates a two-roll flooded-nip coater 501, according to an embodiment of the present invention. The two-roll flooded-nip coater 501 can be used to apply one side or both sides of the foam filter 70. As shown in FIG. 8, two rollers 511 are placed side-by-side horizontally with a gap between them. The roller speed and size is independently controlled and may be different for each roller, according to an embodiment of the present invention. Furthermore, the roller temperature may be individually controlled. The coating material 177 is placed in excess into the roller gap and the filter 70 is fed into the gap and through the roller system. The gap distance between the rollers 511 is significantly smaller than the foam thickness. The gap distance may be smaller than half of the thickness so as to impregnate the open-cell structure of the reticulated foam with the coating material. According to an embodiment of the present invention, the gap distance may be as small as 2% of the foam thickness. After the foam filer 70 passed through the roller system, each side of the foam filer 70 has a polymeric coating 77 and the polymer-coated foam filter 70 is shown as a polymer-coated member 79.

Figure 9:
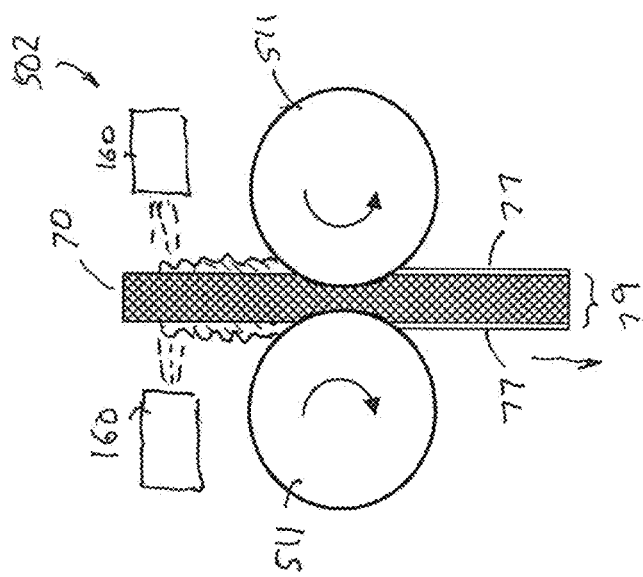
FIG. 9 illustrates a spray manifold and roll coater, according an embodiment of the present invention.

FIG. 9 illustrates a roll coater 502 with a spray manifold, according to an embodiment of the present invention. As shown in FIG. 9, two sprayers 160 are placed on the sides of the foam filter 70 to spray coating material 177 on the filter surfaces. The coating material 177 is sprayed onto each side of the foam filter 70 in an amount equal to the desired coating weight or higher. The coated foam filter is fed between two rollers 511 in order to distribute the coating homogeneously throughout the foam structure. High viscosity coating material can be diluted to reduce viscosity and make it sprayable. Temperature can be increased to reduce viscosity. Dilution and temperature-increase should be balance with the pot life of curable coating. After the foam filer 70 passed through the roller system, each side of the foam filer 70 has a polymeric coating 77 and the polymer-coated foam filter 70 is shown as a polymer-coated member 79.

Figure 10:
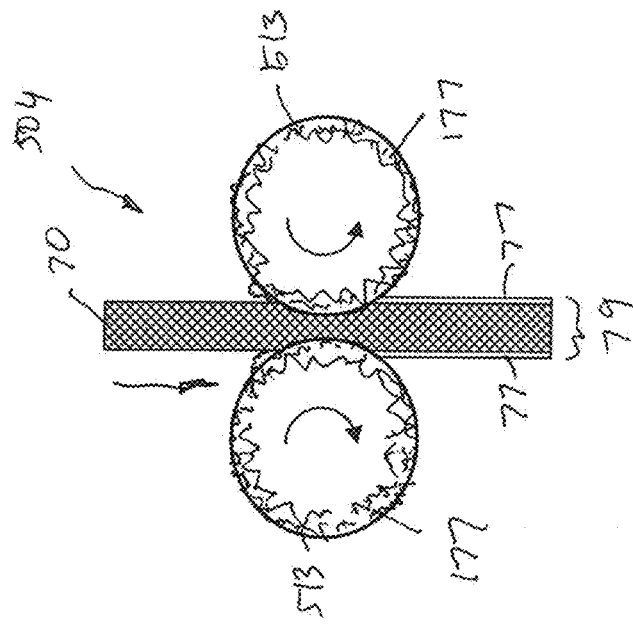
FIG. 10 illustrates an extruder and roll coater, according an embodiment of the present invention.

FIG. 10 illustrates a roll-coater 503 with an extruder system, according to an embodiment of the present invention. As shown in FIG. 10, an extruder 150 is used to extrude the coating material 177 on each side of the foam filter 70. The coated foam filter is fed between two rollers 511 in order to distribute the coating homogeneously throughout the foam structure. After the foam filer 70 passed through the roller system, each side of the foam filer 70 has a polymeric coating 77 and the polymer-coated foam filter 70 is shown as a polymer-coated member 79.

Figure 11:
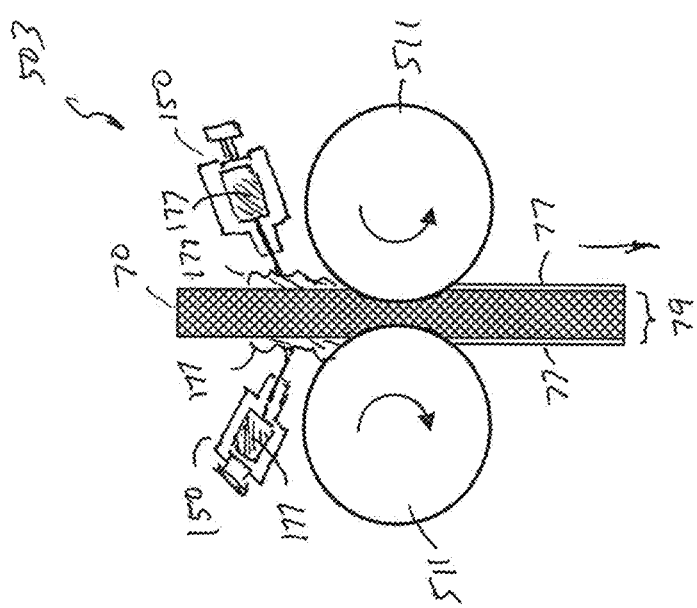
FIG. 11 illustrates a porous coater, according an embodiment of the present invention.

FIG. 11 illustrates a roll coater 504 with porous roller 513, according to an embodiment of the present invention. As shown in FIG. 11, two porous rollers 513 are placed side-by-side horizontally with a gap between them. Each of the porous rollers 513 may be arranged to contact a material supply source so that the coating material 177 is fed through the porous rollers 513 that compress and apply the coating material 177 onto the foam filter 70. After the foam filer 70 passed through the roller system, each side of the foam filer 70 has a polymeric coating 77 and the polymer-coated foam filter 70 is shown as a polymer-coated member 79. The porous rollers 513 may be made of metal, ceramic or open-cell foam.

Figure 12:
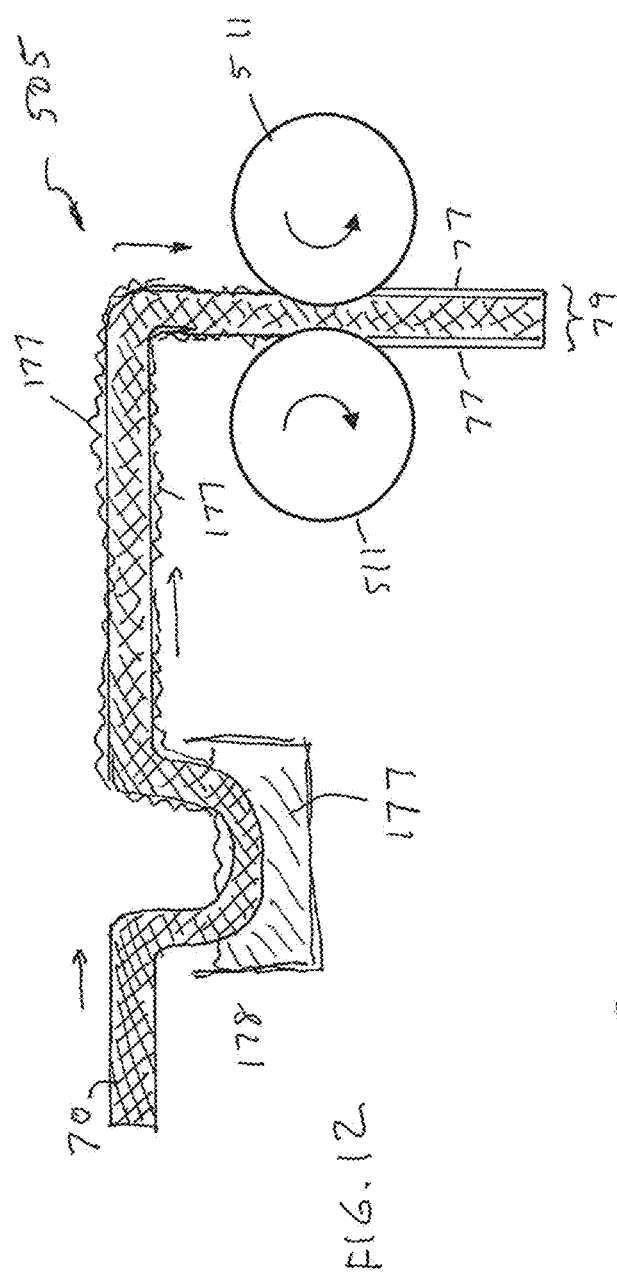
FIG. 12 illustrates an immersion coater, according an embodiment of the present invention.

FIG. 12 illustrates an immersion coater 505, according to an embodiment of the present invention. As shown in FIG. 12, the foam filter 70 is fed through a bulk coating vessel such as a container 178 containing the coating material 177. The foam filter 70 with coating material 177 is fed through the rollers 511 to remove the excess coating material. After the foam filer 70 passed through the roller system, each side of the foam filer 70 has a polymeric coating 77 and the polymer-coated foam filter 70 is shown as a polymer-coated member 79.

Figure 13:
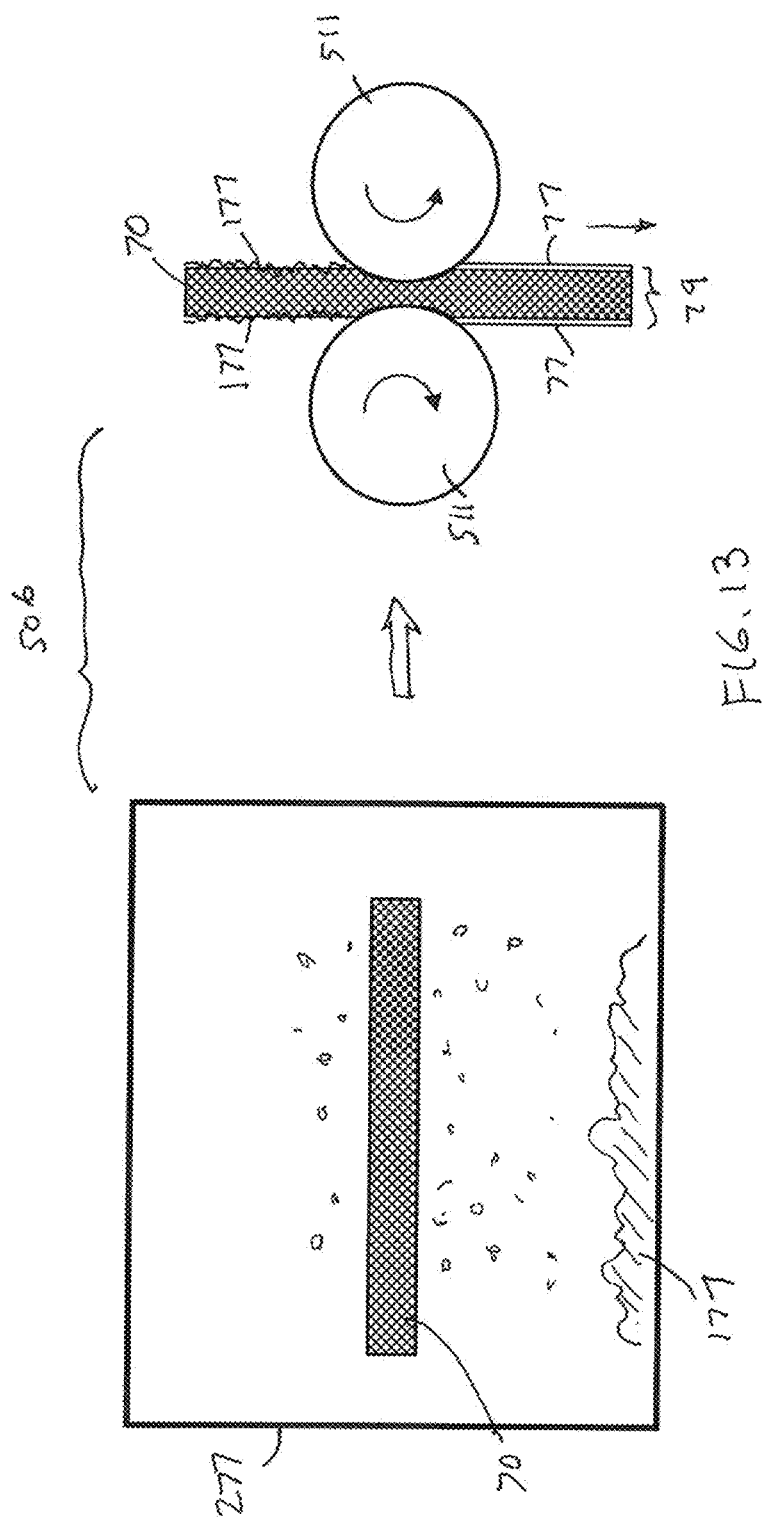
FIG. 13 illustrates a coater with a vacuum impregnation vessel, according an embodiment of the present invention.

FIG. 13 illustrates a coating system 506 using vacuum impregnation, according to an embodiment of the present invention. As shown in FIG. 13, the foam filter 70 is placed in a bulk coating vessel such as a vacuum chamber 277 containing coating material 177. The vacuum inside the chamber 277 draws the coating material 177 into the foam filter 70. The coated foam filter is fed between two rollers 511 in order to distribute the coating homogeneously throughout the foam structure. After the foam filer 70 passed through the roller system, each side of the foam filer 70 has a polymeric coating 77 and the polymer-coated foam filter 70 is shown as a polymer-coated member 79.

Figure 14:
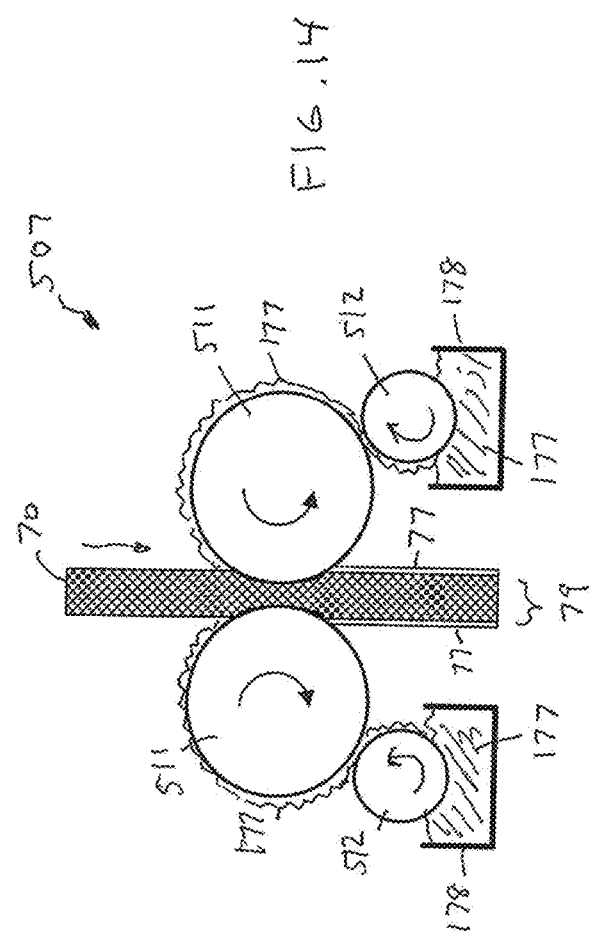
FIG. 14 illustrates a meter-roll coater, according an embodiment of the present invention.

FIG. 14 illustrates a metering-roll coater 507, according to an embodiment of the present invention. Various roll configurations may be used to apply the coating material 177 onto the foam filter 70. As shown in FIG. 14, each pick-up roll 512 may be immersed in the coating material 177 in a container 178. The coating material 177 is then offset onto the coating roll 511 and then onto the foam filter 70. The coating material 177 on the coating roll 511 may be optimized by offsetting onto a metering roll, doctor roll or doctor blade. According to an embodiment of the present invention, a series of rolls can carry the coating material from a reservoir to a pick-up roller, transfer roll, the coating roll and onto the foam filter 70. Excess coating material can be removed by running the coated foam filter through a back-up roll and a Mayer bar or Wiper bar with the excess coating material returned to the reservoir, for example.

Applications

The scope of the invention is described in relation to mineral separation, including the separation of copper from ore.

By way of example, applications are envisioned to include

Rougher, scavenger, cleaner and rougher/scavenger separation cells in the production stream, replacing the traditional flotation machines.

Tailings scavenger cells used to scavenge the unrecovered minerals from a tailings stream.

Tailings cleaning cell used to clean unwanted material from the tailings stream before it is sent to the disposal pond.

Tailings reclamation machine that is placed in the tailings pond to recover valuable mineral that has been sent to the tailings pond.

Other types or kinds of valuable material or minerals of interest, including gold, molybdenum, etc.

However, the scope of the invention is intended to include other types or kinds of applications either now known or later developed in the future, including applications related to oil sands separation that includes separating bitumen from sand and water in the recovery of bitumen in an oil sands mining operation.

THE SCOPE OF THE INVENTION

It should be further appreciated that any of the features, characteristics, alternatives or modifications described regarding a particular embodiment herein may also be applied, used, or incorporated with any other embodiment described herein. Although the invention has been described and illustrated with respect to exemplary embodiments thereof, the foregoing and various other additions and omissions may be made therein and thereto without departing from the scope of the present invention.

What is claimed is:

1. A process for coating a substrate comprising a reticulated foam for collecting mineral particles in a slurry, said process comprising:
arranging a first roller and a second roller adjacent to each other substantially in a horizontal direction, the second roller and the first roller separated by a gap, the gap having an upper portion and a lower portion;
positioning the substrate on the upper portion of the gap, the substrate having a substrate thickness greater than the gap;
providing a coating material onto the substrate,
feeding the substrate from the upper portion of the gap through the lower portion of the gap so as to achieve a layer of the coating material on the substrate, wherein the coating material is selected from the group consisting of nitriles, styrene block copolymers with ethylene, styrene block copolymers with propylene, styrene block copolymers with isoprene and polyvinyl ether, and
modifying the coating material with a modifying material selected from the group consisting of tackifiers; plasticizers; crosslinking agents; adhesion promoters; aryl or alky copolymers; fluorinated copolymers, hexamethyldisilazane; silica and hydrophobic silica.

2. The process according to claim 1, wherein the substrate has two surfaces arranged to contact both the first roller and the second roller simultaneously through the gap.

3. The process according to claim 2, wherein the coating material is provided on the upper portion of the gap and the two surfaces of the substrate are caused to pick up the coating material while the substrate is moved through the upper portion of the gap toward the lower portion of the gap.

4. The process according to claim 2, wherein the coating material is sprayed onto the two surfaces of the substrate above the gap.

5. The process according to claim 2, wherein the coating material is extruded onto one or both surfaces of the substrate above the gap.

6. The process according to claim 2, wherein the first roller and the second roller are porous rollers and wherein the coating material is arranged to load onto the porous rollers so as to cause the coating material on the porous rollers to transfer onto the substrate as part of each rollers is compressed when the substrate is fed from the upper portion through the lower portion of the gap.

7. The process according to claim 2, wherein the coating material is contained in a vessel, and the substrate is arranged to move through the vessel to pick up the coating material before the substrate is fed from the upper portion through the lower portion of the gap.

8. The process according to claim 2, wherein the coating material is contained in a vacuum chamber and the substrate is arranged to locate in the vacuum chamber in order to draw the coating material onto the substrate before the substrate is fed from the upper portion through the lower portion of the gap.

9. The process according to claim 2, further comprising:
one or more rolls arranged to pick up the coating material and to transfer the picked up coating material onto the first roller and the second roller, and wherein the first and second rollers arranged to provide the transferred coating material onto the substrate before the substrate is fed from the upper portion through the lower portion of the gap.

10. The process according to claim 1, wherein the reticulated foam comprises a plurality of pores having a pore size ranging from 5 PPI to 120 PPI.

11. The process according to claim 1, wherein the reticulated foam has a foam thickness ranged from 1/32" to 6".

12. The process according to claim 1, further comprising a heater and/or a blower arranged to accelerate curing of the layer of the coating material on the substrate.

13. The process according to claim 1, wherein the gap has a gap distance which is 2% of the substrate thickness.

14. The process according to claim 1, wherein the layer is further functionalized to be hydrophobic so as to attract the mineral particles in a slurry.

\* \* \* \* \*